(12) United States Patent
Sampson et al.

(10) Patent No.: US 6,416,645 B1
(45) Date of Patent: Jul. 9, 2002

(54) ELECTROLYTIC PROCESS AND APPARATUS FOR THE CONTROLLED REGENERATION OF MODIFIED ION EXCHANGERS TO PURIFY AQUEOUS SOLUTIONS

(75) Inventors: Richard L. Sampson; Allison H. Sampson, both of Bridgeport, CT (US)

(73) Assignees: The State of Connecticut, as represented by the Department of Economic and Community Development, Hartford, CT (US); Silicon Valley Bank, Santa Clara, CA (US)

( * ) Notice: Subject to any disclaimer, the term of this patent is extended or adjusted under 35 U.S.C. 154(b) by 0 days.

(21) Appl. No.: 09/498,021

(22) Filed: Feb. 4, 2000

Related U.S. Application Data

(60) Division of application No. 08/815,371, filed on Mar. 10, 1997, now Pat. No. 6,024,850, which is a continuation-in-part of application No. 08/400,950, filed on Mar. 9, 1995, now Pat. No. 5,609,742, which is a continuation-in-part of application No. 08/141,675, filed on Oct. 27, 1993, now Pat. No. 5,419,816, and a continuation-in-part of application No. 08/639,756, filed on Apr. 29, 1996, now Pat. No. 5,705,050.

(51) Int. Cl.$^7$ ................................. C02F 1/469
(52) U.S. Cl. ................. 204/524; 204/533; 204/536; 521/25
(58) Field of Search ................. 204/524, 533, 204/536, 252, 632; 521/25, 27, 30

(56) References Cited

U.S. PATENT DOCUMENTS

| | | | |
|---|---|---|---|
| 2,428,329 A | 9/1947 | Ham et al. | 204/180 |
| 2,794,777 A | 6/1957 | Pearson | 204/151 |
| 3,074,863 A | 1/1963 | Jasionowski | 204/151 |

(List continued on next page.)

FOREIGN PATENT DOCUMENTS

| | | |
|---|---|---|
| AU | 57658/80 | 2/1981 |
| EP | 0 005 569 | 11/1979 |
| EP | 0 104 911 | 4/1984 |
| EP | 0 422 453 | 4/1991 |
| EP | 650 929 | 5/1995 |
| GB | 568450 | 4/1945 |
| GB | 720316 | 1/1954 |
| GB | 787296 | 12/1957 |
| GB | 2 017 715 | 10/1979 |
| GB | 2 051 865 | 1/1981 |
| GB | 1 585 390 | 3/1981 |
| SU | 819066 | 5/1991 |
| WO | 90/15659 | 12/1990 |

OTHER PUBLICATIONS

Tison, Richard P., Electrochemical Metals Recovery From Dilute Soultions Using Ion–Exchange Material, pp. 114–118, May 1998.

(List continued on next page.)

*Primary Examiner*—Kathryn Gorgos
*Assistant Examiner*—Thomas H Parsons
(74) *Attorney, Agent, or Firm*—Canto Colburn LLP

(57) ABSTRACT

An electrolytic process and apparatus is disclosed for oxidizing or reducing inorganic and organic species, especially in dilute aqueous solutions, and for water purification and treatment. The electrolytic reactor includes an anode, cathode and a packed bed of particulate ion exchange material which, preferably, is modified by converting a portion of the transfer sites to semiconductor junctions which act as mini anodes, or cathodes, to significantly increase the capacity of the reactor to oxidize or reduce the species to be treated, or split water. The ion exchange material may be a monobed of either modified anion exchange material or modified cation exchange material, or a mixed bed of both, and can be in direct contact with either the anode or cathode, or separated from both. Under the influence of direct current, free radical hydroxyl, free radical hydrogen, regenerant hydroxyl ion and/or regenerant hydrogen ion are generated.

10 Claims, 14 Drawing Sheets

U.S. PATENT DOCUMENTS

| | | | |
|---|---|---|---|
| 3,149,061 A | 9/1964 | Parsi | 204/180 |
| 3,764,499 A | 10/1973 | Okubo et al. | 204/151 |
| 3,766,034 A | 10/1973 | Veltman | 204/149 |
| 3,873,668 A | 3/1975 | Melby | 423/24 |
| 4,004,994 A | 1/1977 | Andrus | 204/149 |
| 4,013,554 A | 3/1977 | Reis et al. | 210/40 |
| 4,073,752 A | 2/1978 | Ramp | 260/2.1 R |
| 4,159,235 A | 6/1979 | Kammel et al. | 204/272 |
| 4,165,273 A | 8/1979 | Azarov et al. | 2/301 |
| 4,221,712 A | 9/1980 | Makowski et al. | 260/23.5 A |
| 4,299,675 A | 11/1981 | Korach | 204/98 |
| 4,326,935 A | 4/1982 | Moeglich | 204/180 P |
| 4,356,068 A | 10/1982 | Darlington | 204/98 |
| 4,361,601 A | 11/1982 | Hillman et al. | 427/123 |
| 4,369,103 A | 1/1983 | White | 204/252 |
| 4,389,297 A | 6/1983 | Korach | 204/252 |
| 4,402,809 A | 9/1983 | Dilmore et al. | 204/254 |
| 4,472,252 A | 9/1984 | DeLue | 204/59 R |
| 4,521,283 A | 6/1985 | Pickens | 204/59 R |
| 4,596,641 A | 6/1986 | Bridger et al. | 204/151 |
| 4,636,286 A | 1/1987 | DeLue et al. | 204/59 R |
| 4,636,296 A | 1/1987 | Kunz | 204/182.5 |
| 4,640,945 A | 2/1987 | Peiffer et al. | 523/336 |
| 4,670,360 A | 6/1987 | Habermann et al. | 429/33 |
| 4,758,319 A | 7/1988 | Klinkowski | 204/182.3 |
| 4,786,384 A | 11/1988 | Gerhardt et al. | 204/149 |
| 4,882,018 A | 11/1989 | Tison | 204/105 R |
| 4,983,267 A | 1/1991 | Moeglich et al. | 204/182.4 |
| 5,026,465 A | 6/1991 | Katz et al. | 204/182.4 |
| 5,141,966 A | 8/1992 | Porath | 521/32 |
| 5,183,565 A | 2/1993 | Zimmermann et al. | 210/269 |
| 5,192,446 A | 3/1993 | Salem et al. | 210/685 |
| 5,256,264 A | 10/1993 | Hundenborn et al. | 204/149 |
| 5,419,816 A | 5/1995 | Sampson et al. | 204/59 R |
| 5,609,742 A | 3/1997 | Sampson et al. | 204/536 |

OTHER PUBLICATIONS

White, Geo. Clifford, On–Site Generation of Chlorine, The Handbook of Chlorination, Second Edition, 1986 No month available, pp. 120–149, Van Nostrand Reinhold.

Water Treatment Handbook, Sixth Edition, 199,1 No month available, Lavoisier Publishing Vol. 1, Chapter 8, Regulations.

Newman, Electrochemical Systems, Second Edition, Prentice Hall, pp. 502–506, No date available.

Pletcher, Derek and Walsh, Frank C; Industrial Electrochemistry, Second Edition, Chapman and Hall publishing 1990, pp. 160–167; 278–286 and 342–357, No mounth available.

Helfferich, Friedrich Ion Exchange, McGraw Hill Book Company pp. 58–59, 1962, No mouth available.

ELECTROLYTIC PROCESS AND APPARATUS FOR THE CONTROLLED REGENERATION OF MODIFIED ION EXCHANGERS TO PURIFY AQUEOUS SOLUTIONS

RELATED APPLICATION

This application is a divisional of application Ser. No. 08/815,371, filed Mar. 10, 1997 now U.S. Pat. No. 6,024,850, which is a continuation-in-part of our application, Ser. No. 08/400,950, filed Mar. 9, 1995, now U.S. Pat. No. 5,609,742, which was a continuation-in-part of our earlier application, Ser. No. 08/141,675, filed Oct. 27, 1993, now U.S. Pat. No. 5,419,816. This application is also a continuation of our earlier application, Ser. No. 08/639,756, filed Apr. 29, 1996, now U.S. Pat. No. 5,705,050, to the extent certain disclosures therein are carried forward in the present application.

BACKGROUND OF THE INVENTION

1. Field of the Invention

This invention relates to a modified ion exchange material for the electrolytic oxidation or reduction of inorganic and organic species and for electrolytically splitting water and generating free radical hydroxyl, free radical hydrogen, regenerant hydroxyl ion and/or regenerant hydrogen ion in a packed bed electrolytic reactor containing the modified ion exchange material.

It is generally known that oxidizing inorganic and organic species in dilute aqueous solutions by electrolysis is nearly impossible to accomplish because of the poor mobility of these species in such aqueous solutions to reach the anodic site where oxidation takes place.

2. Description of the Related Art

It is generally known that oxidizing inorganic and organic species in dilute aqueous solutions by electrolysis is nearly impossible to accomplish because of the poor mobility of these species in such aqueous solutions to reach the anodic site where oxidation takes place.

An example of this technology, which is not limited in scope to this example, is the production of halous acids from dilute concentrations of their corresponding halide salts. Such halous acids are particularly useful as oxidizing agents. It is known that electrolyzing dilute halide salts to form their respective halous acid solutions is difficult to accomplish without forming other fully oxidized species such as the halates, which have little oxidizing effect. In order to solve this problem, a number of anodic systems utilizing noble metal catalysts have been developed to prevent the halate ion side reactions from taking place. Even with the latest dimensionally stable anodes, the side reactions will predominate unless the halide concentration in the aqueous solution being electrolyzed exceeds 1500 mg/l. At these elevated concentrations, a small percentage of the halide can be converted to the halous ion.

In actual practice, however, the halide salt concentration is kept between 5000 mg/l and 250,000 mg/l in order to convert a small percentage of the halide directly to the halous solution. At these high salt concentrations, the side reactions that form the undesired halate ions are significantly reduced or eliminated. However, the high concentration of residual salts causes additional problems. Concentrations of greater than 1500 mg/l of halide ions cause corrosion of various bimetal connections found in water plumbing systems, such as water distributors, cooling towers, and swimming pools, as well as any other aqueous process equipment. Thus, electrolysis has not proven to be a reasonable method for the production of halous acids, because the conversion rates are small, and the residual salts are harmful to the distribution systems.

Therefore, in order to control microbiological contamination in these aqueous systems, highly concentrated and potentially dangerous halous solutions are dosed into the dilute streams of water to maintain an adequate concentration of the halous acid needed to control or destroy the offending or undesirable microbes. These microbes can be as simple as pseudomonas and coliform in drinking water or can be viruses and gram positive organisms found in cooling towers, such as legionella. The concentration of these halous oxidizers is controlled in these systems by dosing in the chemical so that a permanent level of the oxidizer is maintained, sufficient to kill the target organism(s) by oxidation or to penetrate colonies or large organisms to disrupt the cell mechanism that causes growth. Contact time, concentration, and pH affect the activity or efficacy of the resultant solution.

Most halous solutions used in present systems are shipped to the point of use in the halite form to prevent autodecomposition of the halous acids back to their salts during transportation. Therefore, most of these solutions are shipped with an excess of caustic in order to render a very high pH for the solution, which ensures that they are active when the potential user requires their use. The user relies on the buffering capacity of the treated water to lower the pH of the halite solutions to a point where the halous acid forms and the solution becomes active. If the treated solution does not have the proper acidity, either too high or too low, required to produce the desired halous acid concentration by dosing, however, either acid or caustic must be added to maintain the activity level and effective half life of the halous acid.

All water as it is received in nature has various levels of salts, hardness ions, alkalinity, and pH which make it unfit for consumption or further commercial and industrial uses. Therefore, mechanical and chemical treatment, such as filtration and chlorination, must be performed on it to render it potable or fit for further use. Indeed, the Public Drinking Water Act and the World Health Organization require that potable water contain less than 500 mg/l of dissolved solids. As stated previously, it is impractical with the present technology to electrolyze water which contains less than 1500 mg/l of dissolved salt to form halous acids, such as hypochlorous acid. Therefore, potable water is impractical to electrolyze directly because of its low salt content. To make the water easy to electrolyze, salt must be added which then makes the water non-potable.

The dosing of municipal, industrial and commercial water systems is a major undertaking, requiring the shipment of enormous quantities of halogen solutions. It is estimated that in excess of 20 million tons of halogen solutions are shipped annually, in the United States and Canada alone.

When the contrary problem arises, where the solution to be treated contains too high a level of oxidizing substances or oxygen, chemical reducing agents are added in excess to reduce the oxidation problem to levels that present satisfactory operating conditions. These reducing agents can be as simple as carbon for strong oxidizers such as chlorine, or they can be strong reducing agents such as hydrazine which are dangerous to ship, handle, and dispense in accurate dosages.

The problem of the prior art electrolytic systems is that dilute salt solutions have low conductivity which results in low mobility of the reactive species to reach the appropriate site on the anode or cathode where the oxidation or reduction reaction can take place. The oxidation or reduction of the reactive species occurs when the free radical hydroxyl or free radical hydrogen, produced by the splitting of the water molecule at the cathode or anode, respectively, is contacted by the reactive species. As used herein, it is intended that the term "free radical hydroxyl", be synonymous with other terms used in the art for this electrolytic ion, such as previously used terms "nascent oxygen," "molecular oxygen" and "singlet oxygen." Similarly, the term "free radical hydrogen" is intended to be synonymous with other terms used in the art, such as "nascent hydrogen" and "singlet hydrogen."

The starvation of such reactive ions species as halide salts to the anode or cathode is a phenomena known in the art as polarization, and it results in the excess generation of free radical hydroxyl or free radical hydrogen which continues to oxidize or reduce the reactive ion species into a nonusable halate solution. An additional significant problem associated with electrolytic conversion of dilute halide solutions, as well as other dilute salt solutions, arises from the fact that the surface area of the anode or cathode is limited so that intimate contact between the species to be oxidized or reduced and the free radical hydroxyl or free radical hydrogen does not occur. Hence, very poor conversion of the species to be oxidized or reduced can be achieved. These two major problems existing with prior electrolytic methods have not been overcome to date.

Various mechanisms have been tried for mixing, and porous and packed bed electrodes have been tried, for the oxidation of halides to halous acids, without success to date. Indeed, the electrolytic industry has relied on noble metal oxides attached to substrates of titanium and its analogs to form desired semiconductor junctions at which water can be split and oxidation can take place. Porous electrodes help to solve the problem of large electrode surface area, but they do not resolve the problem of ionic mobility in dilute solutions.

There are many known electrochemical processes using resin and/or membranes in combination for many varied purposes, including the electro-demineralization of water both by empty and filled-cell electrodialysis, the electrodialytic concentration of soluble metals from dilute solutions onto the resins in the electrochemical apparatus, and the production of chlorine from concentrated brine in membrane chlor alkali cells. For example, in U.S. Pat. Nos. 4,299,675 and 4,356,068, ion selective membranes are used as an immobile electrolyte and the electrodes are bonded to the membrane to reduce ionic resistivity. Also of interest are U.S. Pat. Nos. 4,369,103 and 4,636,286. However, no prior art system has been effective in electrolytically oxidizing, or reducing, reactive species in dilute solutions having salt concentrations less than 1500 mg/l, especially in oxidizing dilute halide solutions to halous solutions.

SUMMARY OF THE INVENTION

In describing the present invention, specific terminology will be resorted to for the sake of clarity. However, the invention is not intended to be limited to the specific terms so selected, or to the specific embodiments disclosed. It is to be understood that each specific term includes all technical equivalents which operate in a similar manner to accomplish a similar purpose, and the specific embodiments are intended to illustrate, but not limit, the broad technical application and utility of the present invention.

The present invention relates to a packed bed electrolytic reactor comprising an anode, a cathode and a packed bed of particulate ion exchange material provided between the anode and cathode. The particulate ion exchange material is preferably closely packed and can be in contact with either the anode or the cathode, or both, or separated from both the anode and cathode by suitable ion exchange membranes or diaphragms. The ion exchange material functions as an immobile electrolyte having an infinite number of transfer sites. The particulate ion exchange material and its transfer sites facilitate ionic mobility between the electrodes when using a dilute solution containing a reactive ionic species.

In the preferred embodiments of the present invention, the ion exchange material is treated so that the electrolytic reactor will have numerous "semiconductor junctions" incorporated into the packed bed of particulate ion exchange material. The semiconductor junctions are formed by permanently attaching an oppositely charged ionic species (counter ion) to the particulate ion exchange material of the packed bed to occupy a percentage, preferably a minor percentage, of the exchange sites of the ion exchange material. Attachment of such a counter ion to an active site of the ion exchange material forms the semiconductor junction, which functions as an anode or a cathode, depending upon the ionic character of the counter ion, and acts as an electrocatalyst in the electrolytic reactions.

While the packed bed of the electrolytic process and apparatus of the present invention is preferably, for most applications, a single species, such as all modified cation exchange resin or all modified anion exchange resin, it has been found that variation in the bed is possible in certain circumstances, and minor amounts of the opposite ion exchange material can be tolerated. Further, it is not always necessary that the packing material be in contact with both the anode and the cathode in the electrolytic reactor; it having been found that, depending upon the nature of the packing material, it may need be in contact with only one electrode to create the desired free radical. In addition, while particulate ion exchange materials are the preferred physical form for the monobed ion exchange material, other physical forms can be utilized.

Further, it has been found, in accordance with the present invention, that when a packed bed of modified ion exchange resin, whether a monobed of either cation exchange resin or anion exchange resin, or a mixed bed of both, is separated from both the anode and cathode, regenerant hydroxyl and regenerant hydrogen ions are formed at the semiconductor junctions. Hence, the ion exchange resins can be continuously regenerated electrically to displace the exchanged ions coming from the water to be purified. Once these exchanged ions, or ionic impurities in the water, are displaced from the ion exchange resins, they leave the ion exchange chamber by conventional electrodialysis. The resulting purification of the water is much improved over conventional electrodialysis in that it has been found, in accordance with the present invention, that weekly ionized species, such as carbon dioxide and silica, can be removed from the water stream to be purified.

The present invention has wide point of use applications for treatment of municipal water supplies and water plumbing systems, such as water distributors, cooling towers, etc., as well as point of use applications in other fields, including sanitization and sterilization, such as medical, dental and veterinary disinfection and sterilization, surface and instrument disinfection and sterilization, hot and cold water sanitization, dental water line sanitization, membrane sanitization and sterilization, as well as food and animal disinfection, bacteria control, waste treatment, and ionic purification of aqueous solutions. More specifically, the invention relates to processes for using the packed bed electrolytic reactor to oxidize or reduce desired inorganic or organic species, including the oxidation of halide ions to the halous state in dilute solutions, not previously possible. Further, the process of the present invention also overcomes the problems of the prior art in an economical, practical and useful manner.

It is, therefore, an object of the present invention to provide an improved electrolytic reactor in which mobility of the reactive ion species to be oxidized or reduced toward the anode or cathode, respectively, is significantly increased, especially in dilute aqueous solutions.

Another object of the present invention is to provide a method and apparatus for improving the efficiency of electrolytic oxidation or reduction of an inorganic or organic species, especially in dilute aqueous solutions.

A further object of the invention is to provide an electrolytic reactor having semiconductor junction sites which act as extended anodic or cathodic sites at which oxidation or reduction can occur, at locations spaced from the anode and cathode.

It is a still further object of the invention to provide improved electrolytic processes for oxidizing and reducing inorganic and organic species in dilute solutions.

Yet another, and very important, object of the present invention is to provide an electrolytic reactor which can be employed at a user's site to generate halous acid from halide salts to control microbiological contamination in dilute aqueous water solutions. As a result, for the first time, direct electrolytic conversion of the halide salts to halous acids is feasible for dilute aqueous solutions, such as used for municipal drinking water, commercial and industrial usages including water distributors and cooling towers, and swimming pools, as well as a wide variety of other point of use applications including sanitization and sterilization, such as medical, dental and veterinary disinfection and sterilization, surface and instrument disinfection and sterilization, hot and cold water sanitization, dental water line sanitization, membrane sanitization and sterilization, as well as food and animal disinfection, bacteria control, and waste treatment.

A yet still further object of the present invention is to provide a modified ion exchange material for electrolytic oxidation or reduction of inorganic or organic species in an electrolytic reactor containing the modified ion exchange material, especially a modified ion exchange material having semiconductor junction sites formed thereon.

Still another object of the present invention is to provide an ion exchange material, modified to have semiconductor junction sites thereon, which can be employed in an electrolytic reactor to split water electrolytically and generate free radical hydroxyl, or free radical hydrogen, together with the respective regenerant hydrogen or regenerant hydroxyl ions in a suitable monobed, or both free radicals and regenerant ions in a suitable mixed bed.

A final object of the present invention to be recited herein is to utilize the modified ion exchange materials of the present invention in an electrolytic reactor for water purification or other treatment purposes, in which the semiconductor junction sites split water into regenerant hydrogen and/or hydroxyl ions which in turn electrolytically regenerate the resin material.

These together with other objects and advantages which will become subsequently apparent reside in the details of the technology as more fully hereinafter described and claimed, reference being had to the accompanying drawings forming a part hereof, wherein like numerals refer to like parts throughout.

DETAILED DESCRIPTION OF THE INVENTION

Figure 1:
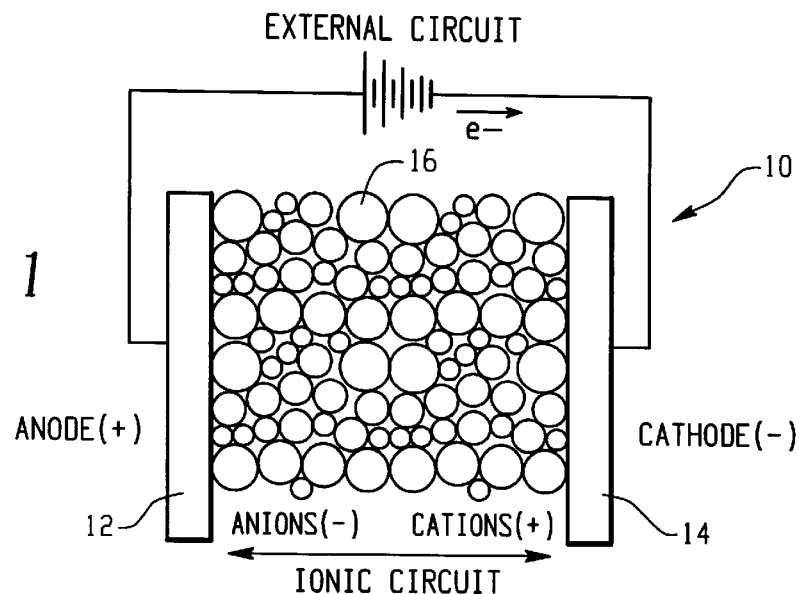
FIG. 1 shows a cross-sectional view of a basic packed bed electrolytic reactor with the ion exchange resin bed in contact with the electrodes in accordance with the present invention.

Referring now to FIG. 1, there is shown a cross-sectional view of a basic packed bed electrolytic reactor 10 of the present invention. The electrolytic reactor 10 includes an anode 12, a cathode 14 and a packed bed of particulate ion exchange material 16 located therebetween. The anode and cathode are connected to a source of direct current (DC) in a conventional manner. As shown, the anions move toward the anode and the cations move toward the cathode of the ionic circuit through the packed ion exchange material. Meanwhile, electrons travel the external circuit from the anode to the cathode in the conventional manner.

Figure 1A:
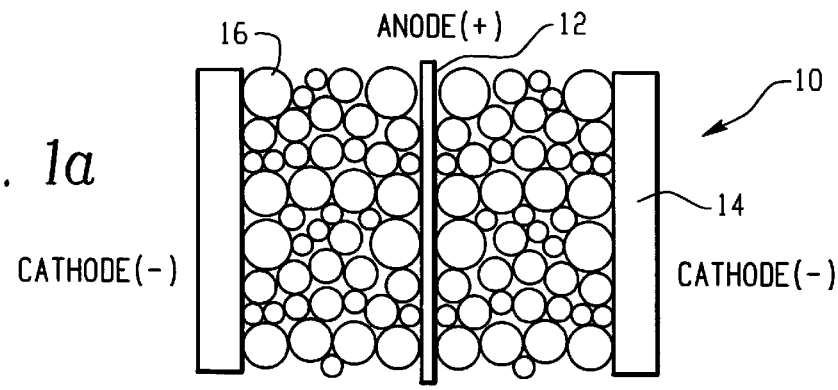
FIG. 1A shows a cross-sectional view of another basic packed bed electrolytic reactor with the ion exchange resin bed in contact with the electrodes in accordance with the present invention.
Figure 2:
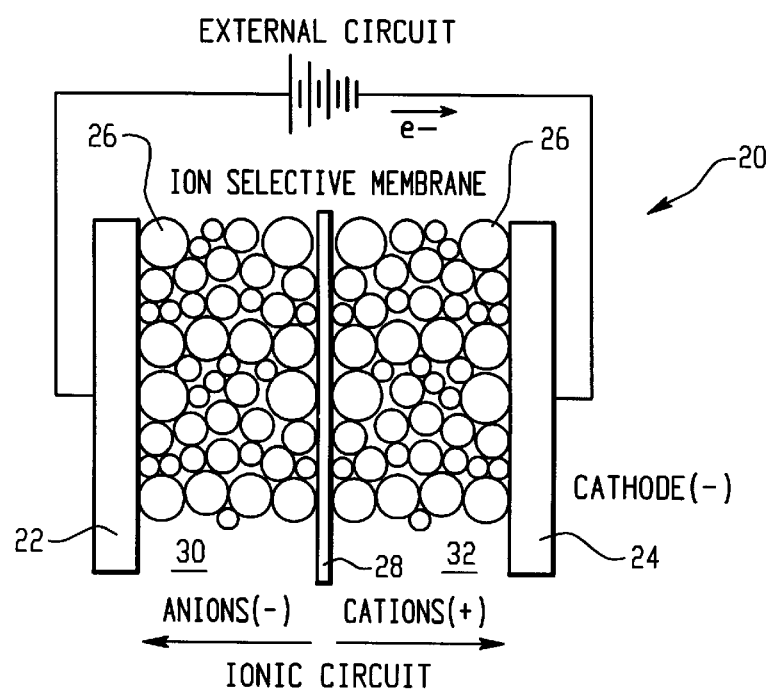
FIG. 2 shows a cross-sectional view of another embodiment of an electrolytic reactor in accordance with the present invention.

In the embodiment shown in FIG. 1A where like numerals are used, the cathode 14 is in the form of a cylindrical tube, and the anode 12 extends substantially along the central axis of the cathode 14. The particulate ion exchange material 16 is packed into the annular space between the anode 12 and cathode 14. Another embodiment of a packed bed electrolytic reactor of this invention is shown in FIG. 2. In this embodiment, the electrolytic reactor 20 includes anode 22 and cathode 24 which may be in the shape of rods, plates or the like. The particulate ion exchange material 26 is divided into two chambers, anodic chamber 30 and cathodic chamber 32, separated by an ion exchange membrane 28.

While the arrangements of anode, cathode and packed bed illustrated in FIGS. 1, 1A and 2 are presently considered preferable, any arrangement in which a particulate ion exchange material is packed between the anode and cathode in an electrolytic reactor can be used in accordance with this invention. Other embodiments of the invention include, but are not limited to: separation of anolyte and catholyte compartments to control intermixing of gases and solutions; and provision of any number of packed bed chambers separated by ion exchange membranes or diaphragms placed between the anode and cathode to affect other oxidation, reduction, or displacement reactions. For example, in instances where the electrolytic reactor 20 is used for oxidation, or reduction, the ion exchange membrane as shown in FIG. 2 can separate one of the electrodes from the ion exchange material, rather than divide the bed.

As used herein, the term "particulate ion exchange material" includes granules, beads or grains of ion exchange material. The particulate ion exchange material can be an oxidizing exchanger, i.e., a cation exchange resin, or a reducing exchanger, i.e., an anion exchange resin. Examples of ion exchange materials suitable for the present invention include: strong acid polystyrene divinylbenzene cross-linked cation exchangers; weak acid polystyrene divinylbenzene cross-linked cation exchange resins; iminodiacetic acid polystyrene divinylbenzene cross-linked chelating selective cation exchangers; strong base polystyrene divinylbenzene cross-linked Type I anion exchangers; weak base polystyrene divinylbenzene cross-linked anion exchangers; strong base/weak base polystyrene divinylbenzene cross-linked Type II anion exchangers; strong base/ weak base acrylic anion exchangers; strong acid perfluoro sulfonated cation exchangers; strong base perfluoro aminated anion exchangers; naturally occurring anion exchangers such as certain clays; naturally occurring cation exchangers such as manganese greensand.

In addition, it has been discovered that inorganic ion exchange cationic substrates, other than normal organic based cation exchange resins, may also be used as the particulate ion exchange material in oxidation reactions in accordance with the present invention. Certain inorganic ion exchange cationic substrates have unexpectedly been formed to enhance the oxidation reactions of the present invention as well as improve the performance of the permanently bonded metallic oxides forming the semiconductor junctions. For example, a synthetic microporous inorganic material used as a molecular sieve is available which is chemically similar to naturally occurring greensand. This material has over five times the capacity of greensand and comes in bead form similar to normal ion exchange resins. This material is available commercially under the name Molsiv 2000 10×20 sold by the UOP division of Allied Signal Corp. The material is composed of sodium aluminum silicate and belongs to a class of cation exchangers known as zeolites.

The foregoing identification of ion exchange materials in the two previous paragraphs is considered to be illustrative only of suitable types of ion exchange materials useful in the present invention, but is not intended to be limiting of the present invention. Furthermore, mixtures of anion and cation exchange particles may also be used under certain circumstances in order to achieve a particular result.

Typical ion exchange resins which are commercially available and useful in the present invention are: IR 120 sold by Rohm and Haas Company, C 267 sold by Sybron Chemical Inc., and CG 68 sold by Resin Tech, Inc., typical of the synthetic strong acid cation exchange resins that have sulfonated exchange sites; IR 84 sold by Rohm and Haas, typical of synthetic weak acid exchange resins that have carboxylic acid sites; IRC 718 and C 467 sold by Rohm and Haas, typical of synthetic cation resins that are used for entrapping metal ions on a selective basis; manganese greensand, typical of naturally occurring cation exchangers; IRA 410 sold by Rohm and Haas, ASB 2 sold by Sybron Chemical, and SGG 2 sold by Resin Tech, typical of synthetic mixed base anion exchange resins that have quaternary ammonium groups as exchange sites; and IRA 94 sold by Rohm and Haas, typical of synthetic weak base exchange resins featuring tertiaryamine exchange sites.

The anode and the cathode may be made of any suitable material, based on the intended use of the electrolytic reactor. For example, for halous acid production from a halide solution, the anode may be made of a conventional material, such as ruthenium and/or iridium on titanium metal or a titanium oxide ceramic, and the cathode may be stainless steel or steel. Suitable anode and cathode materials are known to those skilled in the art and selection of a particular anode or cathode material is considered within the skill of those knowledgeable in this field.

In one form of the invention, the particulate ion exchange material, such as ion exchange beads, is packed between the electrodes so that the beads are in full contact with the electrodes and with each other. The ionic sites of the ion exchange material then serve as transfer sites for the mobile ions in solution, thus greatly increasing their mobility under the influence of the DC electric field between the anode and cathode. While not intending to be bound by this theoretical explanation, it is believed that the ionic sites of an ion exchange material act as transfer sites because the bead to bead contact is similar to an ion exchange membrane in that there is a continuous ionic connection of ion exchange material of the same nature, either cationic or anionic, which forms an ionic circuit between the electrodes. It is believed that the mobile ions to be transferred travel on the oppositely charged ion exchange materials displacing the like charged ion that is residing there. Indeed, this packed ion exchange material acts as an immobile electrolyte artificially raising the conductivity of the solution between the electrodes and facilitating the transfer of ions to their respective oppositely charged electrodes. The difference between an ion exchange membrane and a packed bed of ion exchange material is that the solution to be treated is allowed to flow freely between the ion exchange material in the packed bed whereas the solution is restricted from passing freely through an ion exchange membrane.

In an alternate, but preferred form of this invention, the bed of ion exchange material is specially treated or modified. Specifically, what has now been discovered is that when an ionic site within an ion exchange bead, or other ion exchange material, is permanently exchanged with a counter ion that is not transferable, a semiconductor junction is formed which will split water molecules. Hence, when so treated, it was surprisingly found that these semiconductor junction sites act as extended anodic or cathodic sites at which oxidation or reduction can occur in the reactor, at locations spaced from the anode and cathode.

As used herein, the term "modified particulate ion exchange material" means available particulate ion exchange materials, such as granules, beads and grains, which have a portion of their ionic sites converted to semiconductor junctions as taught herein. The term "modified ion exchange material" has the same meaning as "modified particulate ion exchange material" except the ion exchange material is not necessarily particulate in nature, which means it is not necessarily in granules, beads, or grains. Such non-particulate ion exchange material may include, but is not limited to, ion exchange powder and membranes, as well as structures formed from either. Such ion exchange materials are known to those skilled in the art and selection of a particular ion exchange material or structure is considered within the skill of those knowledgeable in this field.

The exchange of non-transferable ions can happen when selected slightly soluble multivalent ions are passed through an ion exchanger of the opposite charge displacing the soluble ions that are occupying those sites. They can be transferred or displaced only if they are reduced or oxidized to a more soluble species than the surrounding solution. For example, a cation exchange resin, such as IR 120 sold by Rohm and Haas, which has a very large number of immobile anionic sites, can have a multivalent ion such as $Fe^{+3}$ or $Pt^{+4}$ attached to a portion of the anionic sites. The multivalent ions are not transferable and, therefore, form a permanent semiconductor junction. The following is one example of such a semiconductor junction:

R is representative of the organic part of a cation exchange resin, and the sulfonate group represents the anionic sites thereof. Since the sulfonate group has a single negative charge, platinum in the +4 state ties up four $SO_3^-$ sites, and it becomes ionically bonded to the four sulfonate groups as a metal oxide. As so bonded, the $Pt^{+4}$ ion is not removable from those sites except by incineration.

It has been found that this cation $Pt^{+4}$ semiconductor junction acts similarly to bipolar ion exchange membranes where a cation selective membrane is bonded to an anion selective membrane in that the semiconductor junction can split the water molecules of the aqueous solution. However, the semiconductor junction does not form the hydroxyl ion ($OH^-$), as does the bipolar junction, but rather forms free radical hydroxyl ($OH°$) similar to an anode. Thus, each one of these semiconductor junctions acts as a mini anode to oxidize the available halide, sulfate or other anion in a solution in contact therewith. Meanwhile, the sites that are not bound up by the multivalent ion act as transfer sites for the mobile ions in the solution in the manner previously described. Further, since these semiconductor junctions are anodic, they carry a positive charge which attracts the anion to the site to be oxidized. The contrary happens on a anion resin that has a permanent anion attached, except that now the reaction is a reduction reaction. In this condition, the anion semiconductor junction can even reduce oxygen to water.

A cation exchanger that has counter ions permanently attached to its active ionic sites provides semiconductor junctions which are available for the production of free radical hydroxyl, thus making the solution an oxidizing solution. Similarly, an anion exchanger which has counter ions permanently attached to its active ionic sites now has semiconductor junctions for the production of free radical hydrogen, thus making the solution a reducing solution. In the example given above of $Pt^{+4}$ ionically bonded to sulfonate anionic sites, the semiconductor junction occurs within the metal sulfone group and can give rise to either water splitting or the generation of free radical hydroxyl and hydrogen ion. If the free radical does not locate a species to be oxidized, it decomposes back to hydroxyl ion, because it does not have an external circuit to contribute the electron to. The generation of this free radical hydroxyl and its decomposition is extremely rapid and is believed to have a half life of less than $\frac{1}{10,000}$ of a second.

As such, these semiconductor junctions serve as additional sites for the production of free radical hydroxyl or free radical hydrogen, in addition to the anode and cathode themselves. These junctions significantly increase the number of sites at which the electrolytic reactions take place. At the same time, these junctions attract the species to be oxidized or reduced because they are oppositely charged. Thus, the semiconductor junctions not only increase the sites for producing the free radicals, but also act to decrease the time it takes for the species to reach a reaction site.

Another aspect of the water splitting reaction at the semiconductor junctions is that it forms the hydrogen ion ($H^+$) and the hydroxyl ion ($OH^-$) if there is nothing to be oxidized or capable of being oxidized at the junction. The hydrogen ion is in excess to the equilibria and has the ability to ionically displace mobile cations that are located on the transfer sites unoccupied by the semiconductor junctions. As the water splitting reactions proceed, more and more mobile cations are displaced, and a majority of the transfer sites are converted to the hydrogen form. The opposite reaction takes place on the anion resin in that the semiconductor junctions are of a reducing nature, and the excess hydroxyl ions are capable of displacing mobile anions that are located on the adjacent transfer sites. The result of the displacement reactions is the "regenerating" of the ion exchange material by internally generated chemical. The reactions from the splitting of water are as follows:

Anodic Reactions

Cathodic Reactions

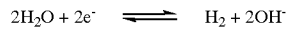

Hence, the ion exchange materials could be placed between electrodes or ion selective membranes in a direct current field and regenerate those materials in place by internally generated hydrogen and hydroxyl ions. These materials can be arranged in a mixture of cation and anion exchange materials or in discrete layers of cation material and anion material. The arrangement of such materials is analogous to mixed bed ion exchange systems and separate bed ion exchange systems.

It has also been found that pH can be controlled by varying the number of semiconductor junctions loaded on the ion exchange material and the amperage applied to that same packed bed ion exchange material. The unpacked reactor has no effect on pH, because it contains no ion exchange material and, therefore, cannot utilize the excess hydrogen ion generated at the semiconductor junctions. In other words, an unpacked reactor has no effect on pH versus current as equivalent amounts of hydroxyl and hydrogen ions are made. This phenomena is directly analogous to the aforementioned displacement/regeneration reactions.

In contrast, according to the present invention, if the ion exchanger is heavily loaded with metal ions and many semiconductor junctions are formed, the number of transfer sites will be limited both for displacement and transfer of ions to be oxidized. This will result in a solution with a lower pH and higher redox potential. The ratio of transfer sites to semiconductor junctions can be optimized and used to control the solution to be produced. For example, a stable iodite solution can be formed with a higher concentration of hypoiodous acid at a higher pH. As a consequence, the redox potential of the resulting solution can be controlled by directing the solution through a packed bed of cationic material bounded by an anode and a cathode to which a specific direct current [DC] is applied.

A typically suitable method for forming the semiconductor junctions for an oxide is the following. A suitable cation resin and a soluble form of a polyvalent metal salt solution, where the metal is existing in the cationic form, are selected. Some polyvalent metals exist in solution in their reduced state, such as ferrous iron and stannous tin, and some exist in solution as anionic complexes, such as platinum. The stoichiometric capacity of the selected resin is calculated, in equivalents, and then the metal salt solution is circulated through the ion exchange resin until it is taken up and exchanged completely with either hydrogen ion or sodium, whichever results in a soluble solution. Depending upon the concentration of the polyvalent metal salt in the solution, the amount of substitution of polyvalent metal ions permanently attached to the cation resin can range from as low as 1% to substantially complete loading, i.e., greater than 95%. To load any further, it is possible but would be very difficult. Then, because the cation exchange resin is to be used in an oxidation reaction, the polyvalent metal ion, if in its reduced state, is converted to its highest valency or oxidation state. A simple procedure for conversion to the highest valency is preferably by contacting the resin bed with a chemical oxidizer, such as potassium permanganate, to permanently affix the counter ion to the resin. Alternatively, conversion to the highest valency can be accomplished by bubbling air or oxygen through the resin bed permanently affixing the counter ion to the resin. When the counter ion loading is calculated, it is important to use the highest valency possible, because as oxidization occurs and an electron is removed, capacity or transport sites are used up.

It has been found from experimentation using strong acid cation exchangers, such as IR 120 sold by Rohm and Haas and CG 68 sold by Resin Tech, with varying levels of permanent semiconductor junctions formed with iron in the ferric state ($Fe^{+3}$) and platinum in he platonic state ($Pt^{+4}$), the conversion of halides improved from small amounts (about 2%) of $Fe^{+3}$ counter ion loading, with performance increasing up to about 50% loading. Any increase in the counter ion $Fe^{+3}$ loading above about 50% did not appear to increase conversion. However, the ratio of semiconductor junctions to transport sites did affect the resultant pH of the solution. This resultant pH does, in turn, affect the reactivity of the halous acid. In contrast to the $Fe^{+3}$ counter ions, trace loading of platinum counter ions $Pt^{+4}$ on strong acid cation resins produced substantially improved performance in the conversion of the halides. Hence, it is currently believed that the multivalent noble metals may be better for performing specific selective oxidations. The presently preferred metals could be one or more of the following, either separately of in some mixture: platinum, ruthenium, iridium, manganese, lead, tin, and iron.

Therefore, if the proper semiconductor junction materials, ratio of sites, contact time, and mixing are correctly selected, it is believed that there is no limit to the percent conversion of the species to be oxidized or reduced, and 100% conversion can be approached. Further, a combination of cation exchange material and anion exchange material may be used to achieve specific results. In addition, a mixture of counter ions bonded to one type of ion exchange material may be used to improve the efficiency of certain reactions. For example, a cation exchange resin could have some semiconductor junctions formed by ruthenium ions and others formed by iridium ions.

In order to optimize and/or specialize the oxidation or reduction reactions, the aqueous solution containing the species to be oxidized or reduced preferably may be pretreated by various means. Some examples of pretreatment which may be used, but are not always necessary in accordance with this invention, include the following: filtration for clarity; carbon filtration for the removal of undesirable organics; specialized ion exchange of the common salts found in water to the desired salts to form specific oxidized or reduced species; and addition of desired species to deionized or other high purity waters to form specific oxidized or reduced species. Other pretreatments may occur to those skilled in the art depending upon the species to be oxidized or reduced, the make up of the aqueous solution, the nature of the ion exchange material and semiconductor junction, and other variables.

DESCRIPTION OF SPECIFIC EMBODIMENTS AND EXAMPLES

Loading of a Particulate Ion Exchange Material to Form Semiconductor Junctions

In order to load an ion exchange resin with a counter ion in a uniform manner, it is necessary to add the counter ions to a bed of ion exchange material which is being agitated so that each particle is exposed to the counter ions in a uniform manner. In addition, the capacity or number of ion exchange sites of any ion exchange material varies widely from batch to batch. For example, IR 120, a cation exchange resin from Rohm and Haas, has a capacity of 1.8 to 2.0 meq/ml (milliequivalents per milliliter). Similarly, IRA 410, an anion exchange resin from Rohm and Haas, has a capacity of 1.2 to 1.4 meq/ml. Therefore, a post-analysis is required to determine the ratio of transfer sites versus permanently loaded semiconductor junctions.

EXAMPLE 1

Forming Semiconductor Junctions on a Cation Exchange Material Using Iron

A one liter batch of strong acid cation resin with about 15% of its exchange sites permanently converted to semiconductor junctions and about 85%. of its exchange sites remaining as transfer sites is prepared as follows.

One liter of Rohm and Haas IR 120 Plus cation resin in the hydrogen form, which is an 8% cross-linked divinylbenzene sulfonated polystyrene strong acid cation exchanger, and three liters of deionized water are placed in a large stirred reactor. While stirring the cation resin/water mixture, a ferrous sulfate solution of 14.4 grams $FeSO_4$ dissolved in one liter of deionized water is added to the cation resin/water mixture at a rate of 33.3 ml/min until all of the ferrous sulfate solution is exchanged onto the cation resin. Stirring is continued for at least one hour to ensure that all of the iron has been taken up by the cation resin. The iron taken up by the cation resin is in the $Fe^{+2}$ (ferrous) form.

Next, the ferrous ion on the cation resin is converted to the $Fe^{+3}$ (ferric) form by aerating the cation resin by bubbling oxygen or air through the cation resin/water mixture for at least twelve hours. The remaining iron solution is rinsed out of the loaded resin by passing five liters of deionized water through the resin. A sample of the resultant solution is taken and tested for iron. If any iron remains in the solution, the quantity of iron remaining must be subtracted from the iron originally in the ferrous solution to determine the number of total equivalents of iron exchanged.

A known volume of the converted cation resin is then titrated to a neutral pH with sodium hydroxide to measure the number of equivalents of sodium ion exchanged with hydrogen ion to determine the number of transfer sites or equivalents still remaining in the cation resin. The number of remaining transfer equivalents plus the total equivalents of iron exchanged equals the total capacity of the cation resin. The percentage of semiconductor sites to total ion exchange sites in the cation resin is calculated as follows:

$$\frac{\text{meq Fe}^{+3}}{\text{meq Fe}^{+3} + \text{meq Na}^+} \times 100 = \% \text{ semiconductor junctions.}$$

A cation resin having a lower or higher proportion of semiconductor junctions up to about 95% according to the above procedure, can be achieved by varying the concentration of $FeSO_4$ in the ferrous sulfate solution proportionately. For example, to produce a cation resin having about 1% semiconductor junctions formed by permanently attached $Fe^{+3}$ ions, the ferrous sulfate solution should contain 0.96 grams $FeSO_4$ in one liter of deionized water; to produce a cation resin having about 10% semiconductor junctions, the ferrous sulfate solution should contain 9.6 grams $FeSO_4$ in one liter of deionized water; and to produce a cation resin having about 50% semiconductor junctions, the ferrous sulfate solution should contain 48.0 grams $FeSO_4$ in one liter of deionized water.

EXAMPLE 2

Forming Semiconductor Junctions on a Cation Exchange Material Using Platinum

A one liter batch of strong acid cation resin with less than 1% of its exchange sites permanently converted to semiconductor junctions and the rest of its exchange sites remaining as transfer sites is prepared as follows.

One liter of the Rohm and Haas IR 120 Plus cation resin in the hydrogen form and three liters of deionized water are placed in a large stirred reactor. While stirring the cation resin/water mixture, a platinic chloride solution of 15.7 grams of a 10% $PtCl_4$ solution in 10% hydrochloric acid (HCl) dissolved in one liter of deionized water is added to the cation resin/water mixture at a rate of 33.3 ml/min until all of the platinic chloride solution is exchanged onto the cation resin. Stirring is continued for at least one hour to ensure that all of the platinum has been taken up by the cation resin. The platinum taken up by the cation resin is in the $Pt^{+4}$ form. Excess HCl solution is rinsed out of the loaded resin by passing 5 liters of deionized water through the resin. A sample of the resultant solution is taken and tested for platinum.

If any platinum remains in the solution, the quantity of platinum remaining must be subtracted from the platinum originally in the platinic chloride solution to determine the number of total equivalents of platinum exchanged.

A known volume of the converted cation resin is then titrated to a neutral pH with sodium hydroxide to measure the number of equivalents of sodium ion exchanged with hydrogen ion to determine the number of transfer sites or equivalents remaining in the cation resin. The number of remaining transfer equivalents plus the total equivalents of platinum exchanged equals the total capacity of the cation resin. The percentage of semiconductor sites to total ion exchange sites in the cation resin is calculated as follows:

$$\frac{\text{meq Pt}^{+4}}{\text{meq Pt}^{+4} + \text{meq Na}^+} \times 100 = \% \text{ semiconductor junctions.}$$

To produce a cation resin having a lower or higher proportion of semiconductor junctions up to about 95% according to the above procedure, the concentration of $PtCl_4$ in the platinic chloride solution is varied proportionately.

EXAMPLE 3

Forming Semiconductor Junctions on a Synthetic Inorganic Cation Exchange Material Using Manganese A one liter batch of strong acid cation inorganic zeolite beads with about 20% of its exchange sites permanently converted to semiconductor junctions and about 80% of its exchange sites remaining as transfer sites is prepared as follows.

One liter of UOP Molsiv 2000 10×20 material, a strong acid cation zeolite in the sodium form, which is a sodium aluminum silicate bead normally used in gas purification, and three liters of deionized water are placed in a large stirred reactor. While stirring the cation zeolite/water mixture, a manganese sulfate solution of 6.6 grams $MnSO_4$ dissolved in one liter of deionized water is added to the cation zeolite/water mixture at a rate of 15.0 ml/min until all of the manganese sulfate solution is exchanged onto the cation zeolite beads. Stirring is continued for at least one hour to ensure that all of the manganese has been taken up by the zeolite beads. The manganese taken up by the cation zeolite beads is in the Mn +2 (manganous) form.

The excess manganese is rinsed out of the loaded resin by passing five liters of deionized water through the zeolite beads. A sample of the resultant solution is taken and tested for manganese. If any manganese remains in the solution, the quantity of manganese remaining must be subtracted from the manganese originally in the manganese solution to determine the number of total equivalents of manganese exchange. The percentage of semiconductor sites to total ion exchange sites in the cation resin is calculated as follows:

$$\frac{\text{meg Mn}+4}{\text{meg Total capacity}} \times 100 = \% \text{ semiconductor junctions}$$

Next, the manganese ion on the cation zeolite beads is converted to the Mn +4 (manganic) form by contacting the cation zeolite beads with one liter of deionized water containing 6 grams of $KMnO_4$ at a rate of 15 ml/min and circulating the cation zeolite/water mixture for at least 4 hours.

A cation zeolite bead having a lower or higher proportion of semiconductor junctions up to about 95% according to the above procedure, can be achieved by varying the concentration of $MnSO_4$ in the manganese sulfate solution proportionately. For example, to produce a cation zeolite bead having about 1% semiconductor junctions formed by permanently attached Mn +4 ions, the manganese sulfate solution should contain 0.33 grams $MnSO_4$ in one liter of deionized water; to produce a cation zeolite bead having about 10% semiconductor junctions, the manganese sulfate solution should contain 3.3 grams $MnSO_4$ in one liter of deionized water; and to produce a cation resin having about 50% semiconductor junctions, the manganese sulfate solution should contain 16.5 grams $MnSO_4$ in one liter of deionized water.

EXAMPLE 4

Forming Semiconductor Junctions on an Anion Exchange Material Using Sulfonated Polystyrene A one liter batch of strong basic anion resin with about 15% of its exchange sites permanently converted to semiconductor junctions and about 85% of its exchange sites remaining as transfer sites is prepared as follows.

One liter of Rohm and Haas IRA 410 anion resin in the hydroxyl form, which is an 8% cross-linked divinylbenzene aminated polystyrene Type II strong base/weak base anion exchanger, and three liters of deionized water are placed in a large stirred reactor. While stirring the anion resin/water mixture, a solution of 17.5 grams of SPS 70 sold by National Starch and Chemical Company, which is a 70,000 Dalton (Molecular Weight) sulfonated polystyrene (SPS) dissolved in one liter of deionized water is added to the anion resin/water mixture at a rate of 20 ml/min. until all of the SPS solution is exchanged onto the anion resin. Stirring is continued for at least one hour to ensure that all of the SPS 70 has been taken up by the anion resin.

Next, a sample of the solution is taken and tested for any SPS 70. If any SPS 70 remains in the solution, the quantity remaining must be subtracted from the SPS 70 originally in the SPS 70 solution to determine the number of total equivalents of SPS 70 exchanged. The anion resin is rinsed with deionized water for at least one hour.

A known volume of anion resin thus produced is then titrated to a neutral pH with hydrochloric acid to determine the number of equivalents of chloride ion exchanged with hydroxyl ion to determine the number of transfer sites or equivalents remaining in the anion resin. The number of remaining transfer equivalents plus the total equivalents of SPS 70 exchanged equals the total capacity of the anion resin. The percentage of semiconductor sites to total ion exchange sites in the anion resin is calculated as follows:

$$\frac{\text{meq SPS 70}}{\text{meq SPS 70} + \text{meq Cl}^-} \times 100 = \% \text{ semiconductor junctions.}$$

To produce an anion resin having a lower or higher proportion of semiconductor junctions up to about 95% according to the above procedure, the concentration of SPS 70 in the SPS 70 solution is varied proportionately. For example, to produce an anion resin having about 1% semiconductor junctions formed by permanently attached SPS ions, the SPS 70 solution should contain 1.17 grams SPS 70 in one liter of deionized water; to produce an anion resin having about 10% semiconductor junctions, the SPS 70 solution should contain 11.7 grams SPS 70 in one liter of deionized water; and to produce an anion resin having about 50% semiconductor junctions, the SPS 70 solution should contain 58.3 grams SPS 70 in one liter of deionized water.

The above procedures can be used to produce cation and anion resins having a percentage of semiconductor junctions up to about 95%, based on the total number of ion exchange sites of the resin. Those skilled in the relevant art can adapt the above procedures for different ion exchange materials and different counter ions having different gram molecular weights and valencies and can readily perform the necessary calculations to determine the appropriate concentration of counter ion solution necessary to produce a desired percentage of semiconductor junctions on a particular cation or anion resin.

EXAMPLE 5

The Packed Bed Electrolytic Reactor

One example of a packed bed electrolytic reactor 10 having the configuration shown in FIGS. 1A and 11 was constructed as follows.

Anode 12 was centered inside a tubular cathode 14 to permit liquid flow from bottom to top in the annular space defined between the anode and the cathode. The anode 12 was a titanium dimensionally stable anode coated with iridium oxide comprising two pieces, each of which was 12 inches long ×0.5 inches wide, the structure being an expanded metal mesh with center conducting wire 13 in between. The surface area of the anode was approximately 22.5 in$^2$ (145 cm$^2$). The cathode 14 was a tubular 316 stainless steel pipe with plastic end caps 34 and 36. The cathode had a 1 inch inner diameter and was 12 inches long. The surface area of the cathode was 37.7 in$^2$ (243.2 cm$^2$).

Particulate ion exchange resin was poured into the annular space between the anode and the cathode along with water to completely fill the void space so that the packed particulate ion exchange material contacted itself as well as the anode and cathode. Porous polypropylene plugs 38 and 40 were provided at the top and bottom of the cathode to retain the packed particulate ion exchange material within the annular space between the cathode and anode. Appropriate fittings 42 and 44 are drilled and tapped into the caps 34 and 36 to allow for extension and centering of the electrode wire 13, and inlet and outlet fittings 46 and 48 are provided to allow for fluid ingress and egress.

Figure 13:
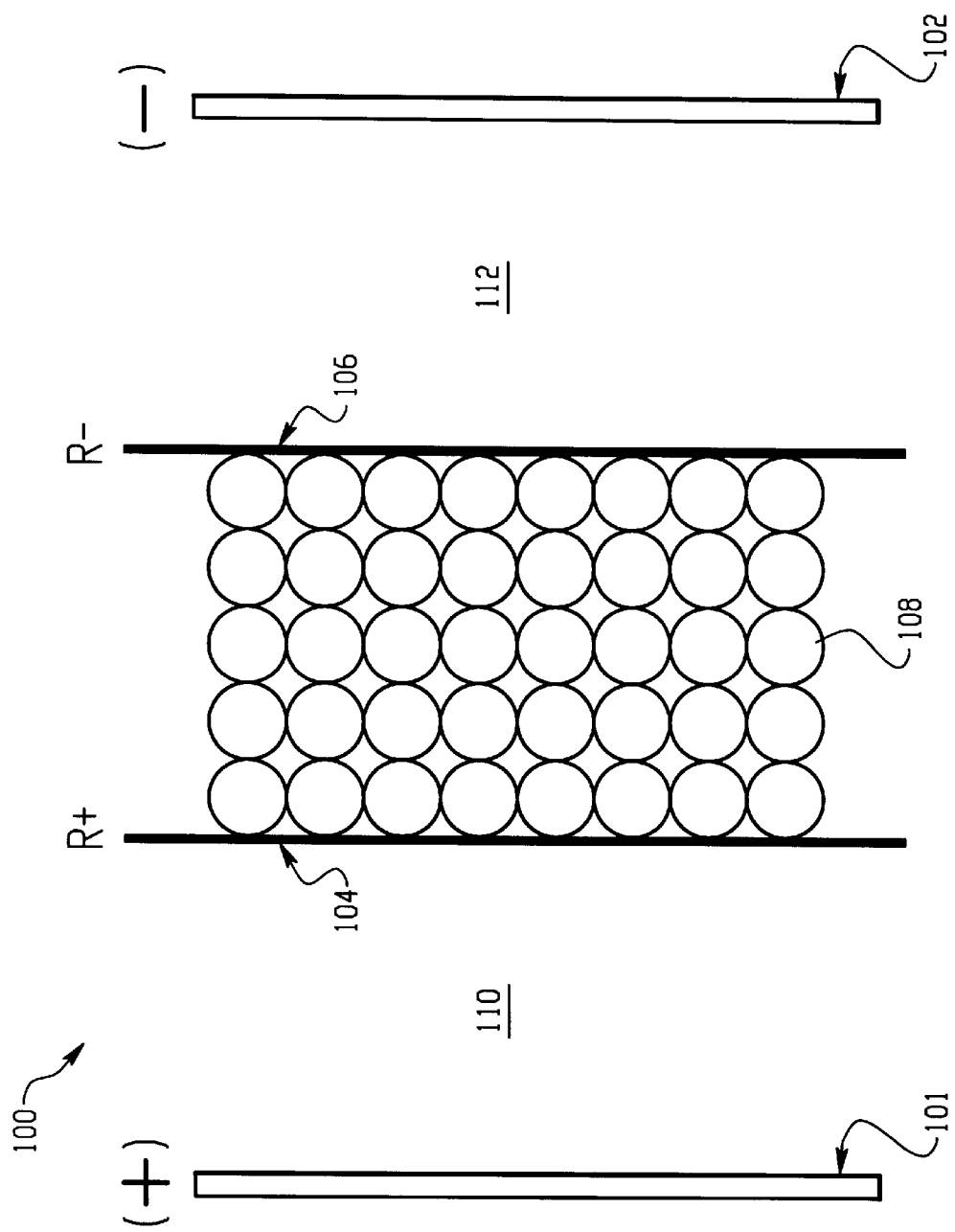
FIG. 13 shows a schematic cross-sectional view of another packed bed electrolytic reactor, in accordance with the present invention, with a modified resin bed separated from the electrodes, and used in connection with the tests producing the results illustrated in FIGS. 16, 17 and 18.
Figure 14:
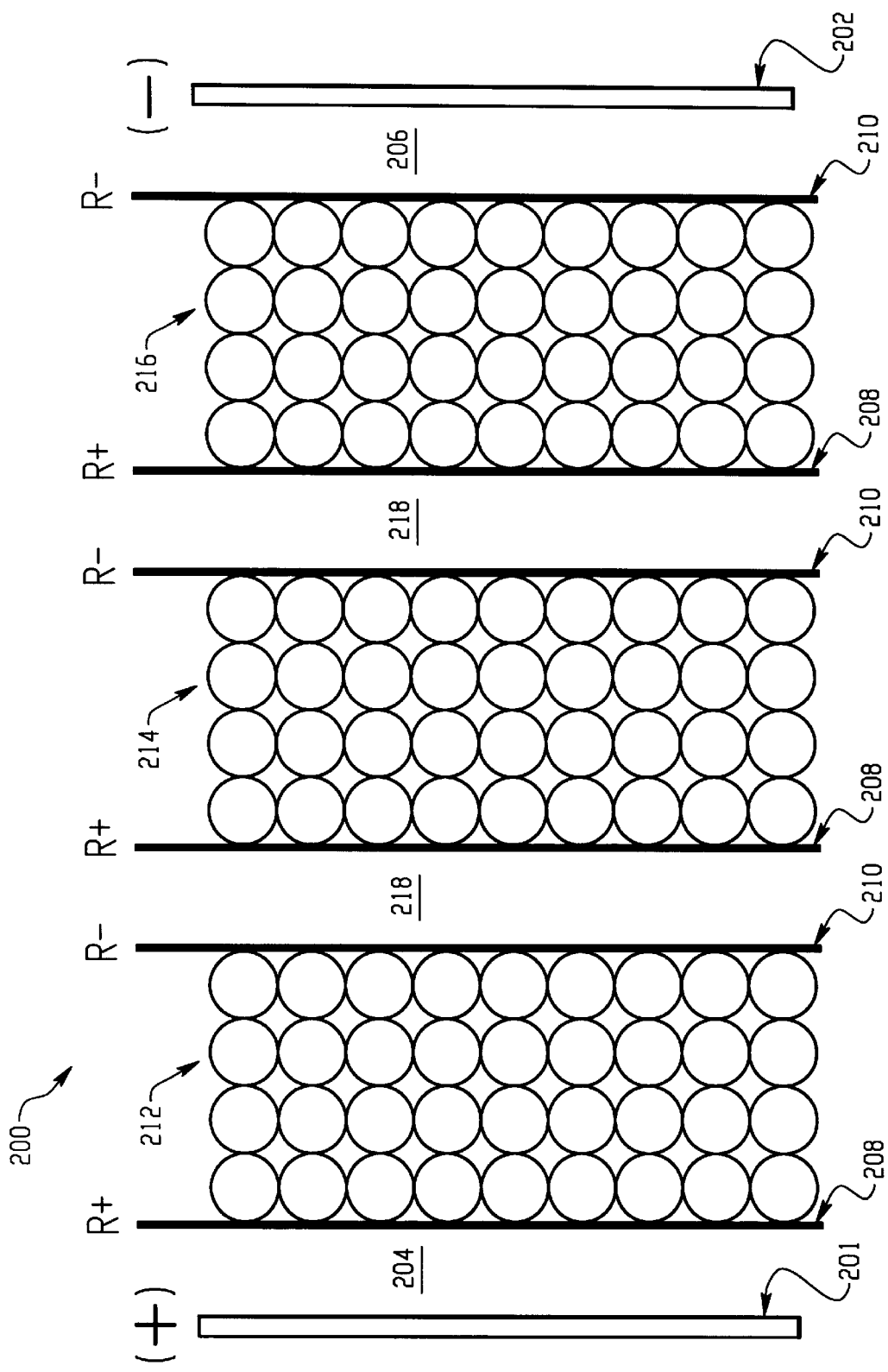
FIG. 14 shows a schematic cross-sectional view of still another embodiment of an electrolytic reactor, in accordance with the present invention, with a modified resin bed separated from the electrodes, and used in connection with the tests producing the results illustrated in FIG. 19.

Other examples of packed bed electrolytic reactors in accordance with the present invention are illustrated in FIGS. 13 and 14. Referring specifically to FIG. 13, there is shown a schematic cross-sectional view of an electrolytic reactor generally designated by the numeral 100. The reactor 100 includes an anode 101, a cathode 102, an anion exchange membrane 104, a cation exchange membrane 106, and a bed of ion exchange material 108, modified in accordance with the present invention to include semiconductor junctions, and packed between the anion exchange membrane 104 and cation exchange membrane 106. An anode chamber 110 is formed between anion exchange membrane 104 and anode 101 and a cathode chamber 112 is formed between cation exchange membrane 106 and cathode 102. The anode 101 and cathode 102 may be in the shape of rods, plates, or the like. The anode and cathode are connected to a source of direct current (DC) in a conventional manner. In accordance with the present invention, the modified ion exchange material 108 can be a monobed of modified cation exchange material or modified anion exchange material, or any suitable mixed bed containing the modified cation and anion exchange resins.

When the reactor is filled with water or other dilute aqueous solutions and a direct current is applied, the semiconductor junctions on the ion exchange material 108 produce regenerant hydrogen ions and/or regenerant hydroxyl ions. These regenerant ions exchange onto the transfer sites of the ion exchange material. The regenerant hydroxyl ions exchange onto the anionic transfer sites forcing the undesirable anions through the anion exchange membrane 104 and into the anode chamber 110 by electrodialysis. The regenerant hydrogen ions exchange onto the cationic transfer sites forcing the undesirable cations through the cation exchange membrane 106 and into the cathode chamber 112 by electrodialysis. The phenomenon of electrodialysis is well known to those schooled in the art of electrochemistry.

Referring now to FIG. 14, there is shown a schematic cross-sectional view of another embodiment of a packed bed electrolytic reactor in accordance with the present invention. The electrolytic reactor generally designated by the numeral 200 includes an anode 201, a cathode 202, an anode chamber 204, a cathode chamber 206, anion exchange membranes 208, cation exchange membranes 210, packed bed modified ion exchange materials 212, 214, and 216, and ion removal chambers 218. The anode 201 and cathode 202 may be in the shape of rods, plates, or the like. The anode 201 and cathode 202 are connected to a source of direct current (DC) in a conventional manner. By way of example only, ion exchange material 212 can be anion exchange resins modified to include semiconductor junctions in accordance with the present invention, ion exchange material 214 can be cation exchange material modified to include semiconductor junctions in accordance with the present invention, and ion exchange material 216 can be a mixed bed of the modified anion and cation exchange resins. However, any suitable arrangement and combination of the monobed and mixed bed modified resins is contemplated in accordance with the present invention.

When a direct current is applied, the semiconductor junctions on the ion exchange materials produce regenerant ions. These regenerant ions exchange onto the transfer sites of the ion exchange materials. The regenerant hydroxyl ions exchange onto the anionic transfer sites forcing the undesirable anions through the anion exchange membranes 208 and into the anode chamber 204 and the ion removal chambers 218 by electrodialysis. At the same time, the regenerant hydrogen ions exchange onto the cationic transfer sites forcing the undesirable cations through the cation exchange membranes 210 and into the cathode chamber 206 and the ion removal chambers 218 by electrodialysis. The phenomenon of electrodialysis is well known to those schooled in the art of electrochemistry.

Electrolytic Production of Hypohalous Acids from Aqueous Halide Solutions

The following examples demonstrate the electrolytic process of the invention for the controlled oxidation of halide species in aqueous solutions. In each example, the tests were all done with the electrolytic reactor described in Example 5 above, and illustrated in FIGS. 1A and 11 and under the same set of conditions. All water was tempered to 77° F., and all solutions flowed upwardly through the reactor. The inlet concentration of potassium iodide (KI) and sodium bromide (NaBr) was 100 mg/l. The graphs shown in FIGS. 3–10 illustrate the results of different packings at the specified flow rates and electrical currents.

EXAMPLE 6

Oxidation of Iodide Ions

A potassium iodide feed solution was prepared as follows. First, a separate bed of cation resin was regenerated to the potassium form and another bed of anion resin was regenerated to the iodide form by passing a 10% solution of potassium iodide in softened water through them in a co-current manner as in a normal water softener device. The resin beds were then rinsed of excess KI solution. Tap water, pretreated by 5 micron pre-filtration followed by carbon treatment to remove organic, chlorine and chloramine compounds that are normally found in public tap waters, was then passed in series through first the cation resin bed and then the anion resin bed, to yield a feed solution of approximately 100 mg/l of KI.

(A) A continuous stream of the 100 mg/l KI feed solution was passed through the packed bed electrolytic reactor having the structure described in Example 5 by passing the KI solution through the reactor from the bottom to top such that the KI solution had a flow rate of 1 liter per minute through the electrolytic reactor. The annular space between the anode and the cathode in this example was packed with IR-120 plus cation resin in the potassium form. While passing the KI solution through the packed bed electrolytic reactor, a controlled current was applied to the cathode and anode.

(B) The procedure of (A) above was repeated, with the exception that the annular space between the anode and cathode was packed with IR-120 Plus cation resin in which 15% of the ion exchange sites had been converted to $Fe^{+3}$ semiconductor junctions as described in Example 1.

(C) The procedure of (A) above was repeated, with the exception that the annular space between the anode and cathode was packed with IR-120 Plus cation resin in which 95% of the ion exchange sites had been converted to $Fe^{+3}$ semiconductor junctions as described in Example 1.

(D) The procedure of (A) above was again repeated, with the exception that the annular space between the anode and cathode was not packed with any particulate ion exchange material. This example serves as a comparative example of a conventional system employing only an anode and a cathode.

Figure 3:
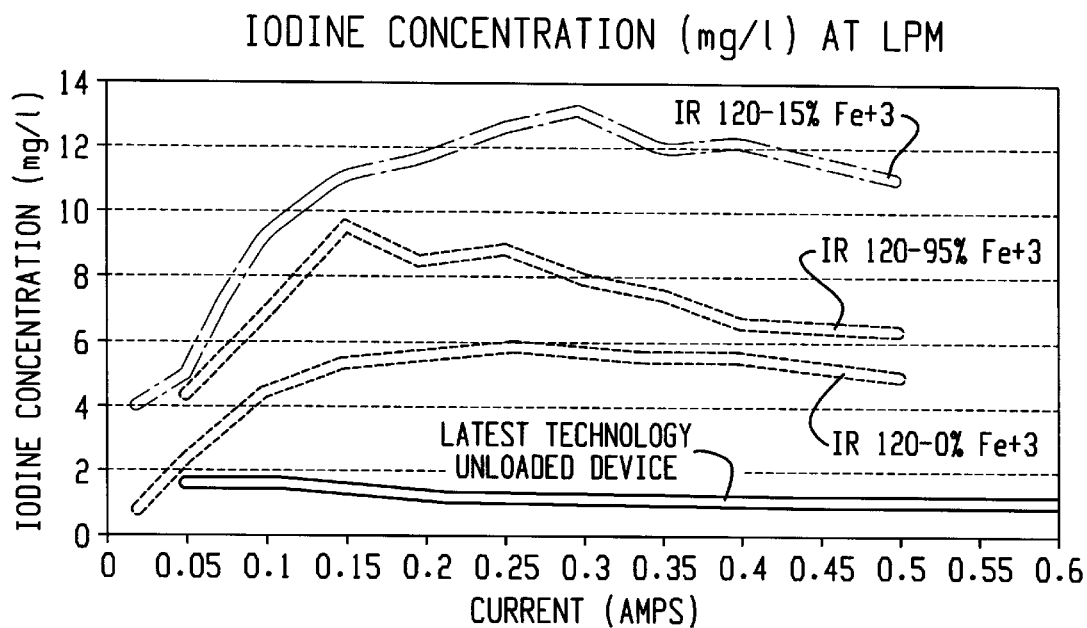
FIG. 3 is a graph showing the iodine concentration versus current produced by oxidation of an aqueous iodide solution by a process of the present invention using various loadings of the ion exchange material, and by a conventional process.
Figure 4:
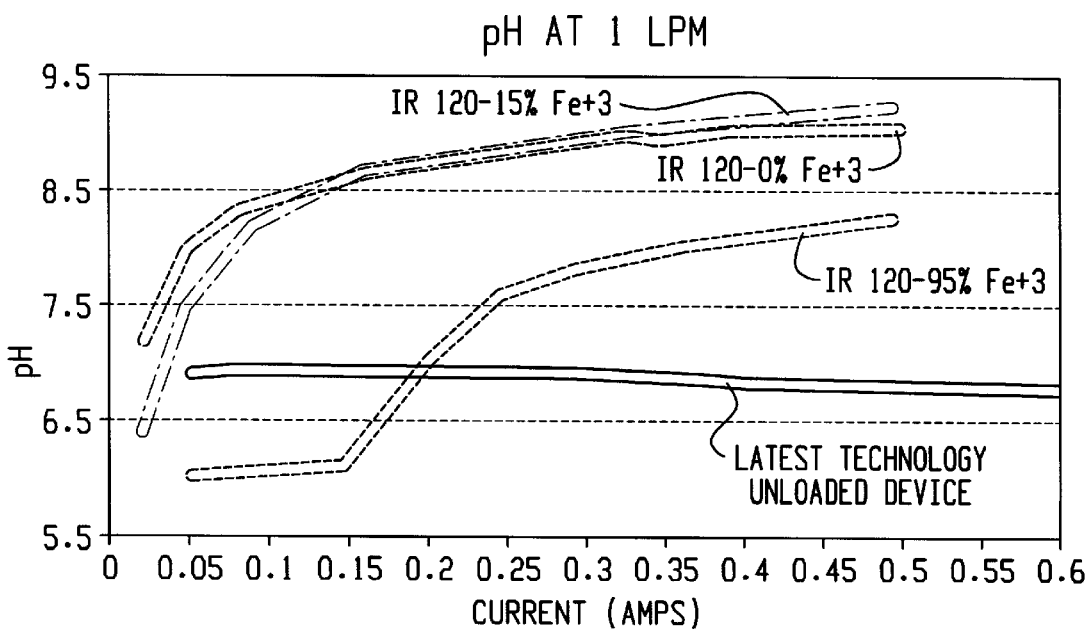
FIG. 4 is a graph showing the pH versus current of an oxidized aqueous iodide solution produced by a process of the present invention using various loadings of the ion exchange material, and by a conventional process.

The results of the electrolytic processes in procedures (A)–(D) are shown in FIGS. 3 and 4. FIG. 3 shows the total iodine concentration (mg/l) of the exiting solution, and FIG. 4 shows the pH of the same solution. In each example, the total iodine content of the solution exiting the packed bed electrolytic reactor was determined in accordance with the DPD Method 8031 of Hach Company using a Direct Reading Spectrophotometer Model No. DR/2000 for the measurement of iodine (0 to 7.00 mg/l), except that the instrument was blanked with deionized water between each sample. The pH of each solution was also measured by standard technique. "Total Iodine" is the combination of iodine and hypoiodous acid. This is sometimes referred to as "free iodine." The two components of free iodine are seldom referred to separately, because they are not easily distinguishable and because certain species are oxidized better by iodine and others by hypoiodous acid. Both components, however, are oxidizers. They exist in solution as a function of pH. At lower pH's, the equilibrium of the solution yields higher concentrations of iodine. As the pH rises, the equilibrium shifts, and higher concentrations of hypoiodous acid are present. The solution is about 50% iodine and 50% hypoiodous acid at a pH of about 7. For all of the examples described, the total halogen concentration and pH were measured in the exiting product stream.

It will be seen that the addition of the ion exchange material having infinite transfer sites (IR 120—0% Fe+3) greatly increases the production of iodine from that produced with the conventional reactor, without ion exchange resin packed therein. When resin with 15% of the transfer sites converted to semiconductor junctions (IR 120—15% Fe+3) was placed in the annular space, the production of iodine increased further, because not only were transfer sites available, but semiconductor junctions were also available to increase the anodic sites. When the resin with 95% of the transfer sites converted to semiconductor junctions (IR 120—95% Fe+3) was placed in the annular space, the production of iodine fell between no loading and 15% loading. It is believed that this lower conversion occurred because the number of transfer sites was greatly limited even though the number of semiconductor junctions was increased.

EXAMPLE 7

Oxidation of Iodide Ions

Figure 5:
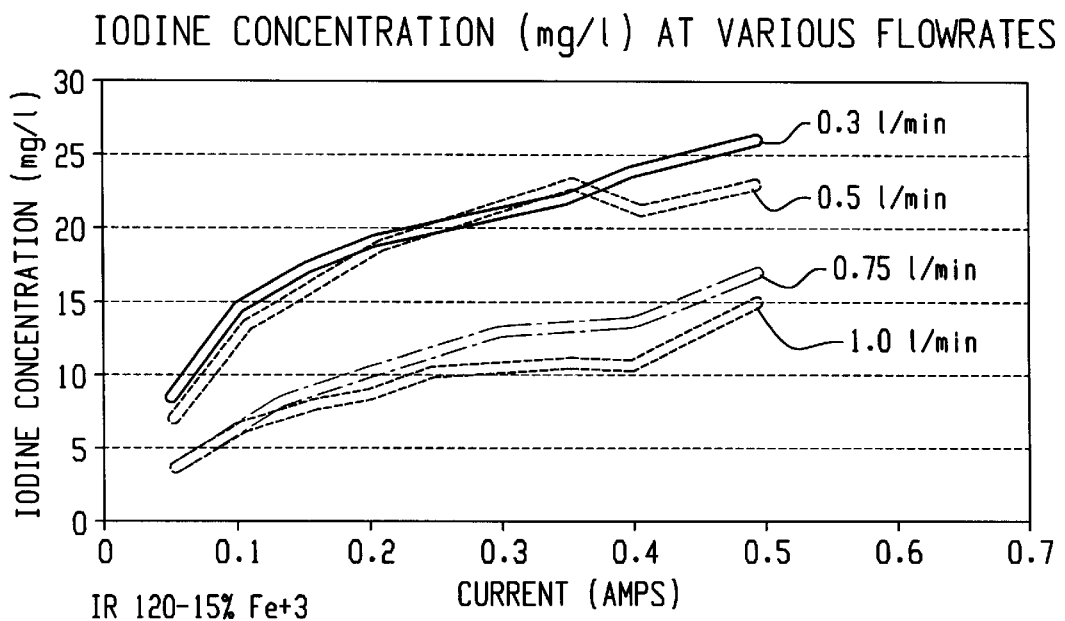
FIG. 5 is a graph showing iodine concentration versus current of an oxidized aqueous iodide solution produced by a process of the present invention at various flow rates.

The procedure of Example 6(B) was repeated, with the exception that the flow rates were varied. FIG. 5 shows the total iodine concentration at the various flow rates of 0.3 l/minute, 0.5 l/minute and 0.75 l/minute, as well as 1.0 /minute. From this data, it can be seen that contact time through the reactor affects iodine production. The longer the contact time, the greater the conversion percentage.

EXAMPLE 8

Oxidation of Iodide Ions

Figure 6:
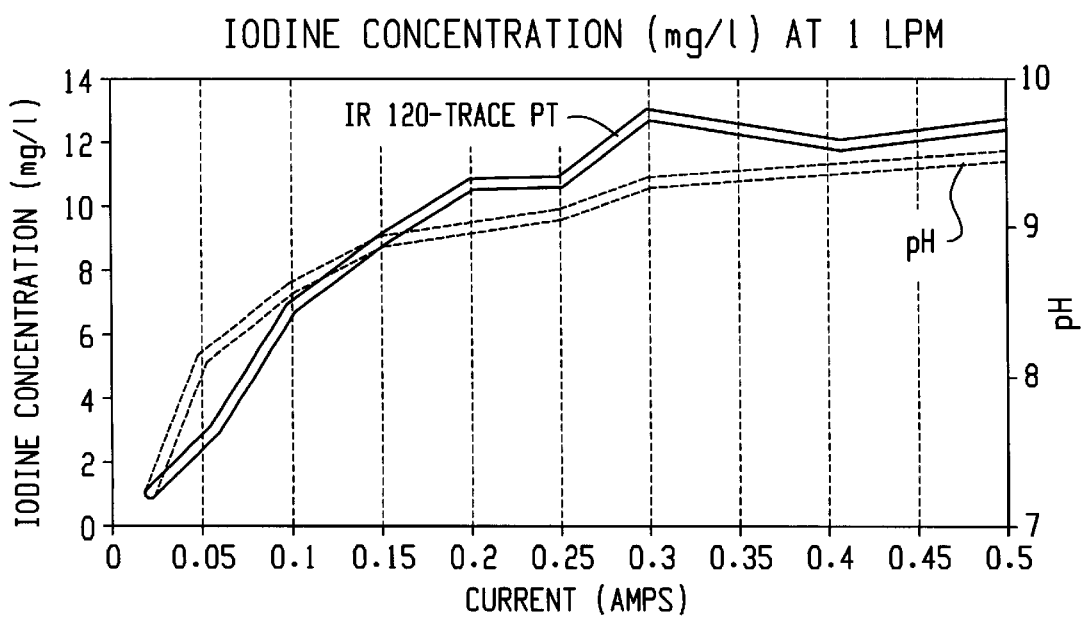
FIG. 6 is a graph showing iodine concentration and pH versus current for an oxidized aqueous iodide solution produced by a process of the present invention.

The procedure of Example 6(A) was repeated, with the exception that the annular space between the anode and cathode was packed with IR-120 Plus cation resin in which less than 1% of the ion exchange sites had been converted to $Pt^{+4}$ semiconductor junctions according to the procedure of Example 2. The total iodine concentration (mg/l) and the pH of the electrolytically oxidized solutions are shown in FIG. 6. The data in FIG. 6 shows that if the correct counter ion is chosen so as to facilitate the electrocatalytic reaction at the semiconductor junction, a smaller number of transfer sites need be converted to semiconductor junctions, because the semiconductor junctions are now specifically suited for the desired reactions.

EXAMPLE 9

Oxidation of Bromide Ions

A sodium bromide (NaBr) feed solution was prepared as follows. First, a separate bed of cation resin was regenerated to the sodium form and another bed of anion resin was regenerated to the bromide form by passing a 10% solution of sodium bromide in softened water through them in a co-current manner as in a normal water softener device. The resin beds were then rinsed of excess NaBr solution. Tap water, pretreated by 5 micron pre-filtration followed by carbon treatment, to remove organic, chlorine and chloramine compounds that are normally found in public tap waters, was then passed in series through the resin beds to yield a feed solution of approximately 100 mg/l of NaBr.

Figure 7:
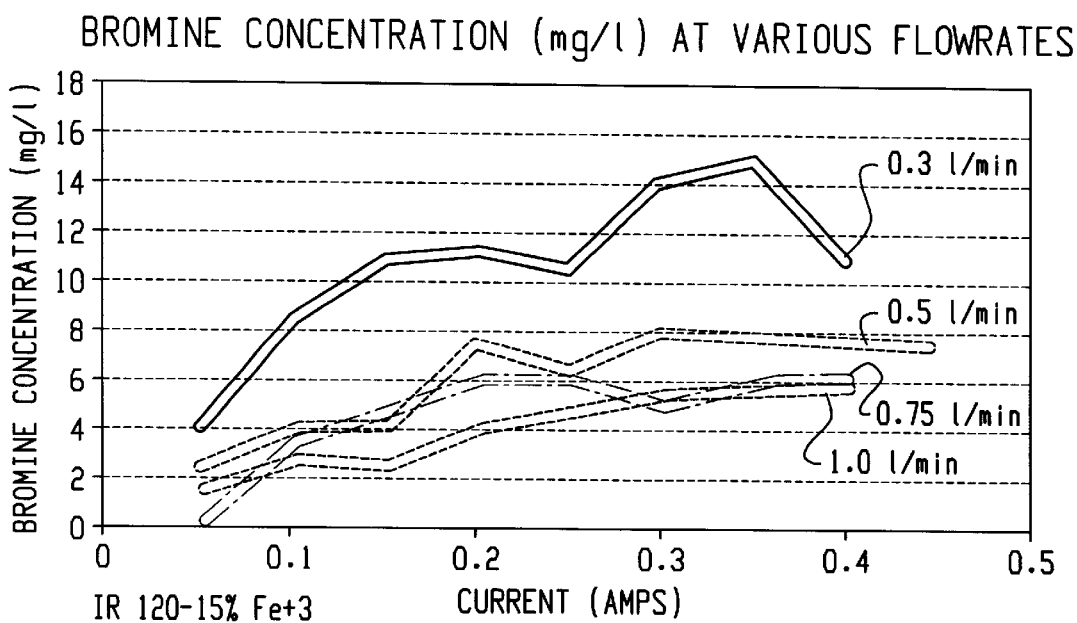
FIG. 7 is a graph showing bromine concentration versus current of an oxidized aqueous bromide solution produced by a process of the present invention at various flow rates in which the ion exchange material contains semiconductor junctions with ferric counter ions.

(A) The procedure of Example 6(B) was repeated, with the exception that the feed solution was the foregoing aqueous NaBr solution rather than a KI solution and the flow rates were varied. FIG. 7 shows the total bromine concentration at the various flow rates of 0.3 l/minute, 0.5 l/minute, 0.75 l/minute and 1.0 l/minute.

Figure 8:
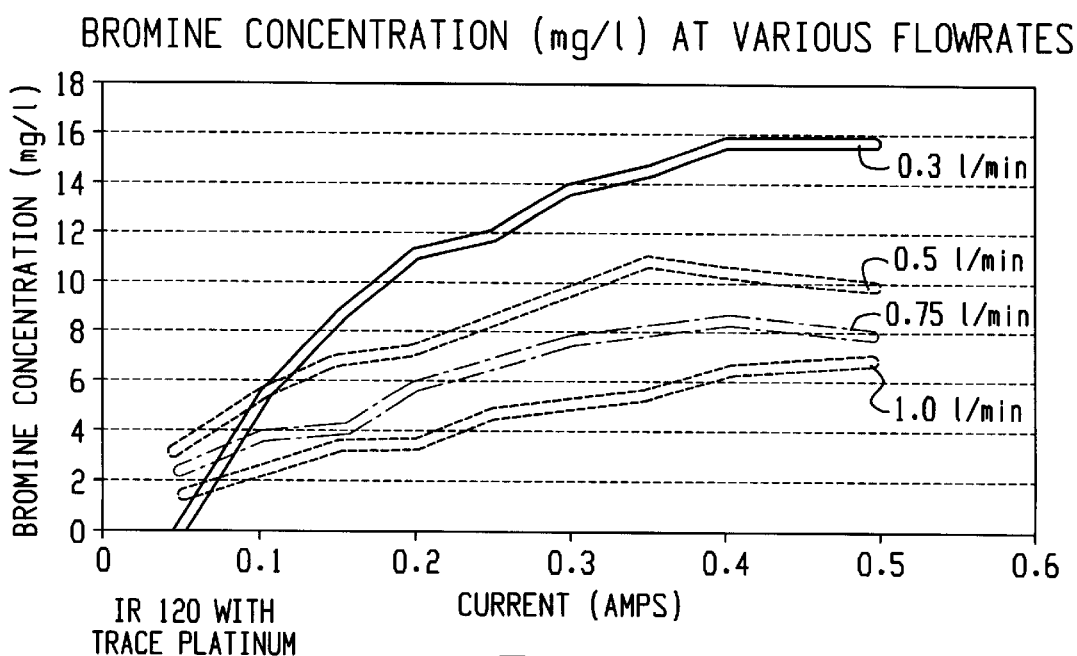
FIG. 8 is a graph showing bromine concentration versus current of an oxidized aqueous bromide solution produced by a process of the present invention at various flow rates in which the ion exchange material contains a small portion of semiconductor junctions with platinum counter ions.

(B) The procedure of Example 8 was repeated with the exception that a feed solution of NaBr rather than KI was used and that the total bromine concentration was measured at flow rates of 0.3 l/minute, 0.5 l/minute and 0.75 l/minute as well as at the flow rate of 1.0 l/minute. The results obtained are shown in FIG. 8.

Figure 10:
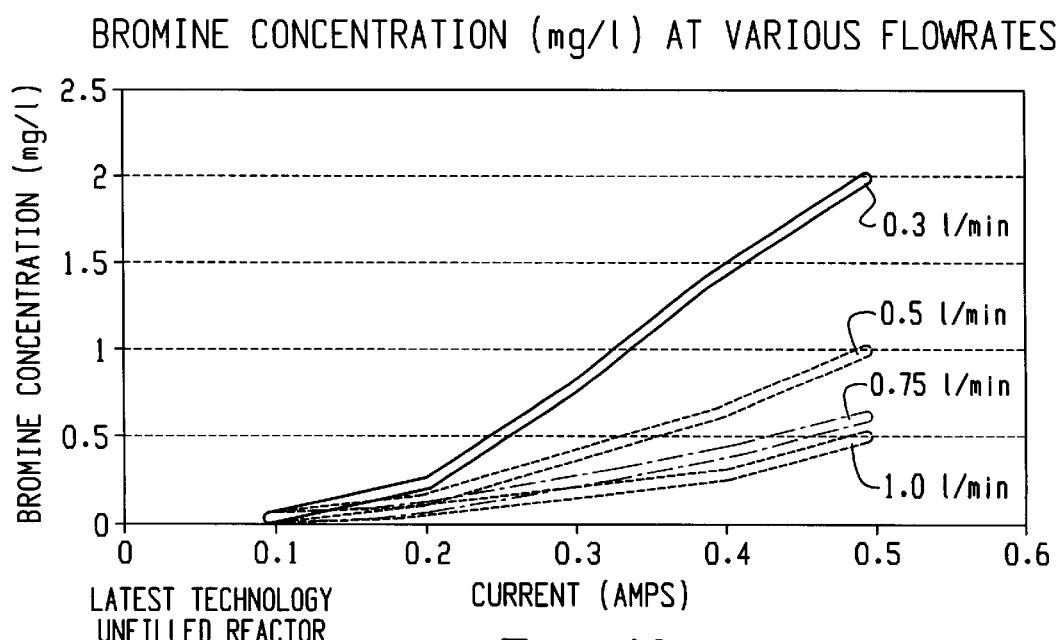
FIG. 10 is a graph showing bromine concentration versus current of an oxidized aqueous bromide solution produced by a conventional process at various flow rates.

(C) The procedure of Example 6(D) was repeated with the exception that the solution was a NaBr solution rather than a KI solution. Again, the NaBr solution flow rate was varied to obtain comparative results for the flow rates of 0.3 l/minute, 0.5 l/minute and 0.75 l/minute, as well as the flow rate of 1.0 l/minute. The results obtained using the conventional, unpacked electrolytic reactor are shown in FIG. 10.

In each of the above examples, the total bromine concentration was measured in accordance with the DPD Method 8031 of the Hach company using a Direct Reading Spectrophotometer Model No. DR/2000, for the measurement of bromine (0 to 4.50 mg/l.), except that the instrument was blanked with deionized water between each sample. As with total iodine concentration, "total bromine" is the combination of bromine and hypobromous acid. This is sometimes referred to as "free bromine," and the discussion above regarding iodine and hypoiodous acid in aqueous solutions and their relative concentrations at varying pH's applies equally to bromine and hypobromous acid.

EXAMPLE 10

Improved Oxidation of Bromide Ions

Substantial improvement in the oxidation of bromide ions to bromine can be achieved by using synthetic inorganic cation exchangers rather than synthetic organic cation exchangers, such as IR 120, even though the number of semiconductor junctions and number of transfer sites have both been reduced.

A sodium bromide (NaBr) solution was prepared as follows. First, 38.625 grams of sodium bromide (NaBr) were added to 50 liters of deionized water. The solution was then mixed to form a 600 mg/l bromide solution. A continuous stream of the 600 mg/l bromide feed solution was passed through the packed bed electrolytic reactor having the structure described in Example 5 by passing the NaBr solution through the reactor from the bottom to top such that the NaBr solution had a flow rate of 100 ml/min through the electrolytic reactor. The annular space between the anode and the cathode in this example was packed with Molsiv 2000 10×20 cation zeolite beads in which 20% of the ion exchange sites had been converted to manganese semiconductor junctions as described in Example 3. While passing the NaBr solution through the packed bed electrolytic reactor, a controlled current was applied to the cathode and anode.

Figure 9:
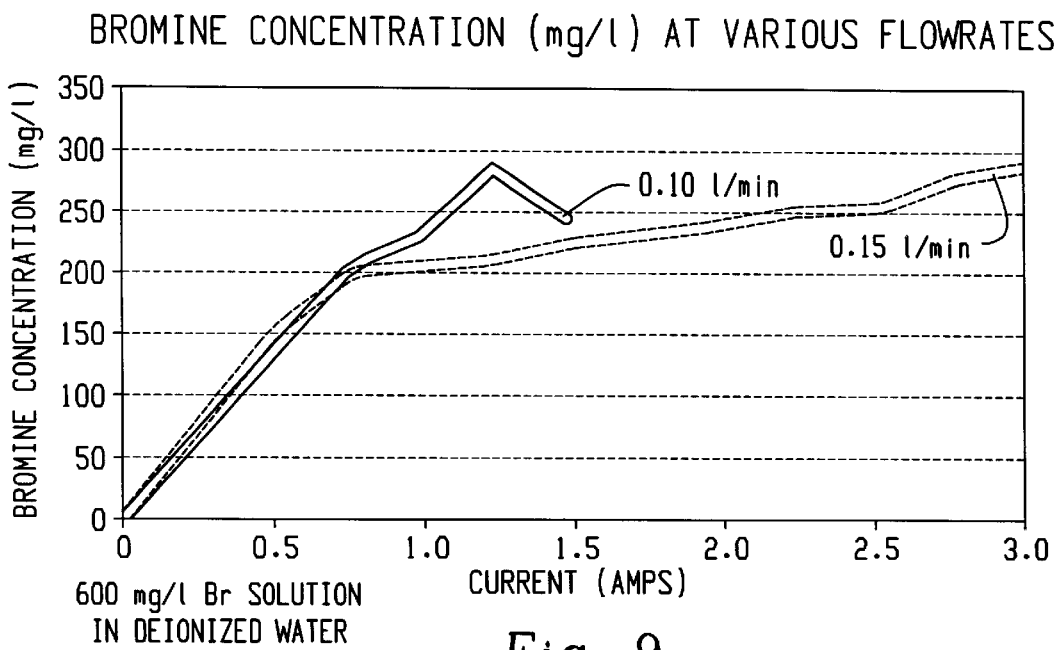
FIG. 9 is a graph showing bromide concentration versus current of an oxidized aqueous bromide solution produced by a process of the present invention at two different flow rates in which the ion exchange material contains manganese catalyzed semiconductor junctions ionically bonded to cation zeolite beads.

In this example, the total bromine concentration was measured in accordance with the DPD Method 8031 of the Hach Company using a Direct Reading Spectrophotometer Model No. DR/2000, for the measurement of bromine (0 to 4.50 mg/l), except that the instrument was blanked with deionized water between each sample. As described in Example 8, "total bromine" is the combination of bromine and hypobromous acid, and is sometimes referred to as "free bromine". As shown in FIG. 9, high conversions approaching 100% of bromide to bromine can be obtained with manganese catalyzed semiconductor junctions ionically bonded to cation zeolite beads.

It will be seen from these bromide to bromine examples that the present invention works as well for this species as the iodide to iodine conversion shown in Examples 6, 7 and 8. Further, by comparing the results shown in FIGS. 7, 8 and 9 with the results shown in FIG. 10, it will be seen that the known technology using the unfilled conventional reactor is significantly inferior to the present invention, irrespective of the flow rate utilized. In fact, the present invention exhibits significantly greater conversion at all flow rates and amperage levels.

Electrolytic Reduction of an Aqueous Solution of Hydrogen Peroxide

The following example demonstrates the electrolytic process of the invention for the controlled reduction of hydrogen peroxide ($H_2O_2$) in aqueous solutions. In the example, the tests were done with the electrolytic reactor described in Example 5 above, and illustrated in FIGS. 1A and 11, and under the same set of conditions. All water was tempered to 77° F., and all solutions flowed upwardly through the reactor. The inlet concentration of $H_2O_2$ was 86 mg/l. The graph shown in FIG. 12 illustrates the results of different packings at the specified flow rate and electrical currents.

EXAMPLE 11

Reduction of Hydrogen Peroxide

An 86 mg/l $H_2O_2$ feed solution was prepared by placing 50 ml of 3% $H_2O_2$ in 15 liters of softened, filtered, and dechlorinated tap water. The solution was then tested on a Hach DR-2000 Spectrophotometer using the Ozone test. Not knowing a direct test for hydrogen peroxide, the Ozone test was used and the results multiplied by 10. The solution tested in this manner showed a concentration of 86 mg/l $H_2O_2$.

(A) A continuous stream of the 86 mg/l $H_2O_2$ feed solution was passed through the packed bed electrolytic reactor having the structure described in Example 4 by passing the $H_2O_2$ solution through the reactor from the bottom to top such that the $H_2O_2$ solution had a flow rate of 100 ml/min through the electrolytic reactor. The annular space between the anode and the cathode in this example was packed with Rohm & Haas IRA 410 Type II anion resin in which 15% of the ion exchange sites had been converted to SPS semiconductor junctions as described in Example 4. While passing the $H_2O_2$ solution through the packed bed electrolytic reactor, a controlled current was applied to the cathode and anode.

(B) The procedure of (A) above was repeated, with the exception that the annular space between the anode was packed with unmodified Rohm & Haas IRA 410 Type II anion resin.

(C) The procedure of (A) above was repeated, with the exception that the annular space between the anode and cathode was not packed with any particulate ion exchange material. This example serves as a comparative example of a conventional system employing only an anode and cathode.

The results of the electrolytic processes in procedures (A)–(C) are shown in FIG. 12. In each example, the total $H_2O_2$ content of the solution exiting the packed bed electrolytic reactor was determined in accordance with the DPD Method 8177 of Hach Company using a Direct Reading Spectrophotometer Model No. DR/2000 for the measurement of Ozone (0 to 1.4 mg/l), except that the instrument was blanked with deionized water between each sample, and the results were multiplied by 10 to convert the Ozone reading to $H_2O_2$ reading.

It will be seen that the addition of the anion exchange material having infinite transfer sites (unmodified Type II resin) greatly improves the reduction reaction over that of the conventional reactor, without ion exchange resin therein. When resin with 15% of the transfer sites converted to semiconductor junctions (Type II resin with 15% SPS) was placed in the annular space, the reduction improved further, because not only were transfer sites available, but semiconductor junctions were also available to increase the cathodic sites.

Formation of Free Radical and Regenerant Ions

For Examples 12, 15 and 16, a Thornton 200CR Conductivity/Resistivity Meter was used to measure the conductivity or resistivity of the methanol solution and the sodium bicarbonate solution. An in-line probe was placed in the exit stream of the reactor in each example to measure the conductivity or resistivity of each solution. For Examples 13 and 14, a Hach 43800-00 pH meter was used to test the pH of the sodium chloride solutions before and after each reactor.

EXAMPLE 12

Free Radical Hydroxyl Formation to Oxidize Methanol

A methanol feed solution was prepared by adding methanol to deionized water such that the final concentration of methanol approximated 100 mg/l methanol. The final resistivity of the solution was tested to be 10 megohm-cm (0.10 microsiemen/cm conductivity).

Figure 11:
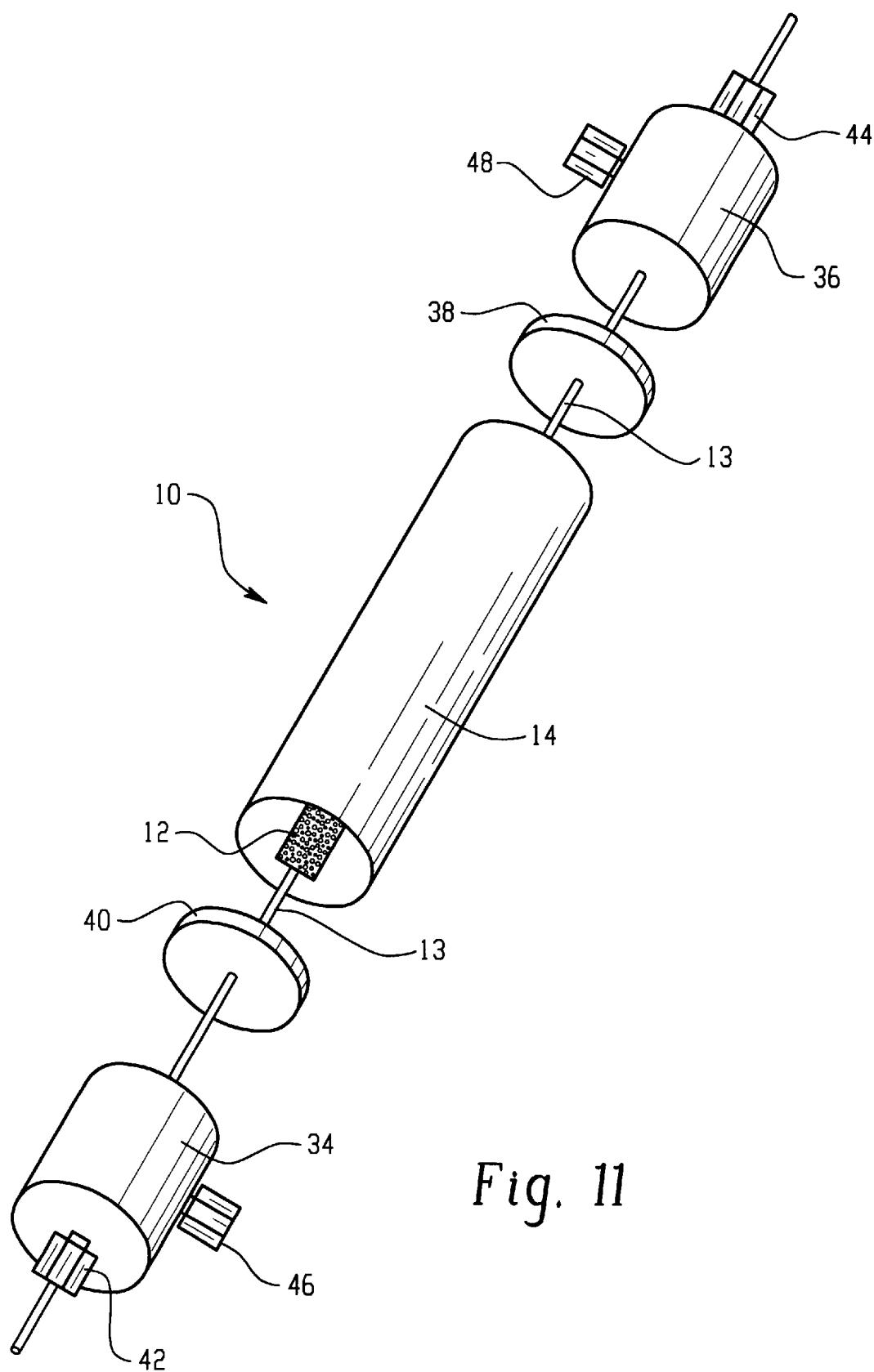
FIG. 11 shows an exploded perspective view of an electrolytic reactor constructed in accordance with FIG. 1A and used in connection with the tests producing the results illustrated in FIGS. 3–10.
Figure 12:
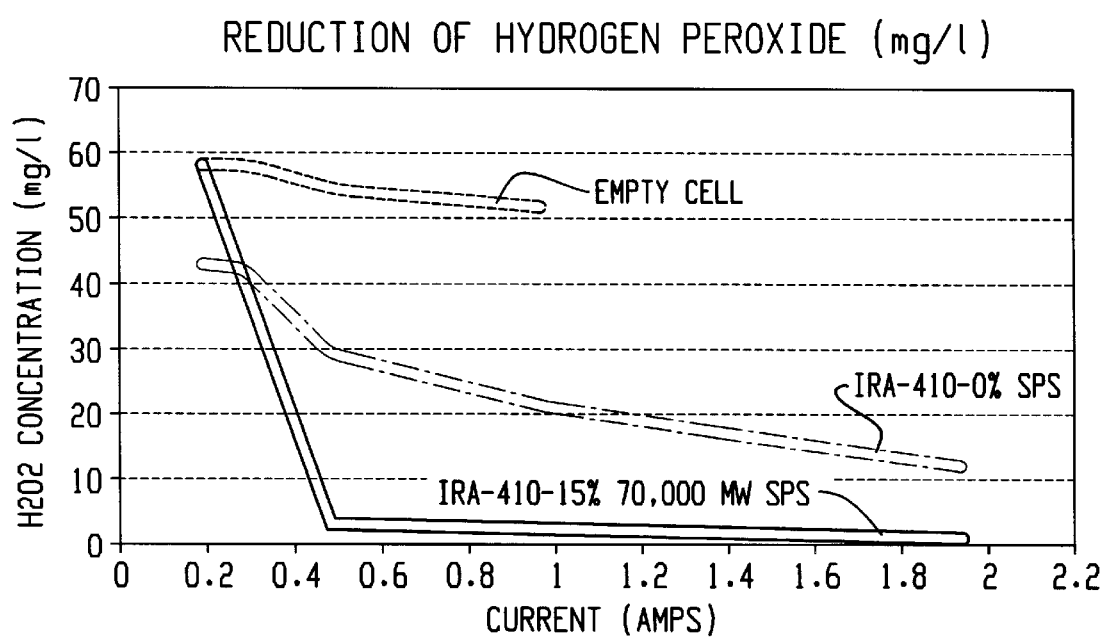
FIG. 12 is a graph showing the hydrogen peroxide concentration versus current produced by reduction of an aqueous hydrogen peroxide solution by a process of the present invention using various loadings of the ion exchange material, and by a conventional process.

(A) A continuous stream of the methanol feed solution was passed through the packed bed electrolytic reactor, having the structure illustrated in FIGS. 1 and 11 and described above in connection therewith, by passing the methanol solution through the reactor from the bottom to top such that the methanol solution had a flow rate of about 100 ml/min through the electrolytic reactor. The space around the anode in this example was packed with strong acid perfluoro sulfonated cation exchange material having about 15% of its transfer sites converted to semiconductor junctions with manganese. No current was applied to the anode and cathode.

(B) The procedure (A) above was repeated, with the exception that a controlled current of 2.0 Amps was continuously applied to the anode and cathode.

Figure 15:
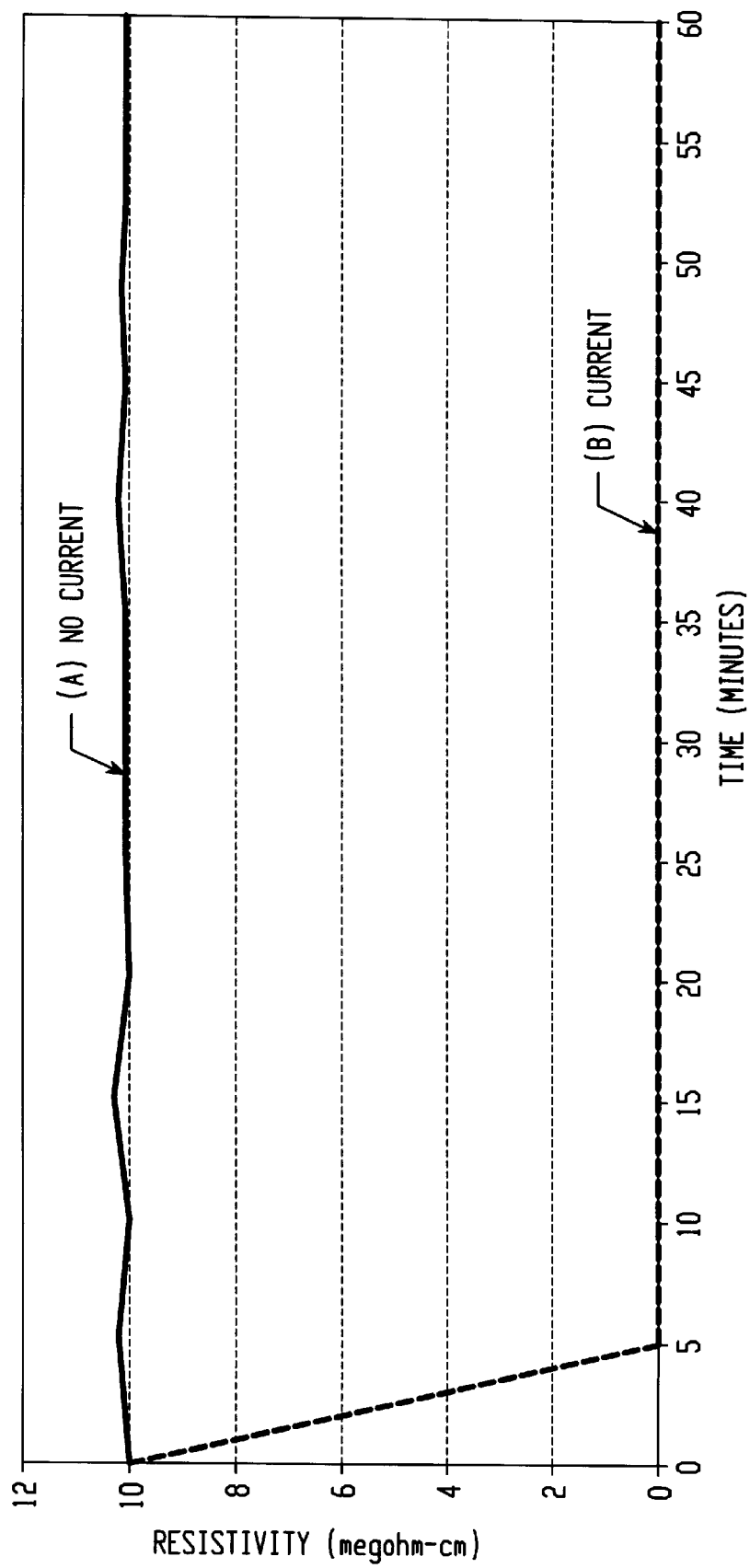
FIG. 15 is a graph showing the resistivity of an exiting methanol solution over time produced by the oxidation of the methanol, in accordance with the present invention, with a direct current applied versus when a direct current is not applied.

The results of the processes in procedures (A) and (B) are shown in FIG. 15. FIG. 15 shows the conductivity change of the exiting methanol solution over time. As shown therein, a conductivity change of the solution occurs only when a current is applied to the reactor. Since methanol is not conductive except in its oxidized form, the decrease in resistivity to near zero indicates the oxidation of the methanol. Further, since oxidation of methanol cannot occur without the presence of free radical hydroxyl, the methanol oxidation demonstrates the production of free radical hydroxyl in accordance with the present invention.

EXAMPLE 13

Hydrogen Ion Formation to Regenerate Cation Exchange Material

A sodium chloride feed solution was prepared by adding sodium chloride to reverse osmosis water such that the final concentration of chloride approximated 100 mg/l as chloride. The pH of the solution was tested to be 7.04.

(A) A continuous stream of the chloride feed solution was passed through a packed bed electrolytic reactor, having the structure illustrated in FIG. 13 and described above in connection therewith, by passing the chloride solution through the modified ion exchange resin 108 from the bottom to top such that the chloride solution had a flow rate of about 500 ml/min through the electrolytic reactor bed. The space between the membranes in this example was packed with strong acid polystyrene divinylbenzene cross-linked cation exchange material having about 15% of its transfer sites converted to semiconductor junctions with manganese. The membranes 104 and 106 were, respectively, conventional anion and cation exchange membranes. No current was applied to the anode and cathode.

(B) The procedure (A) above was repeated, with the exception that a controlled current of 2.0 Amps was continuously applied to the anode and cathode.

Figure 16:
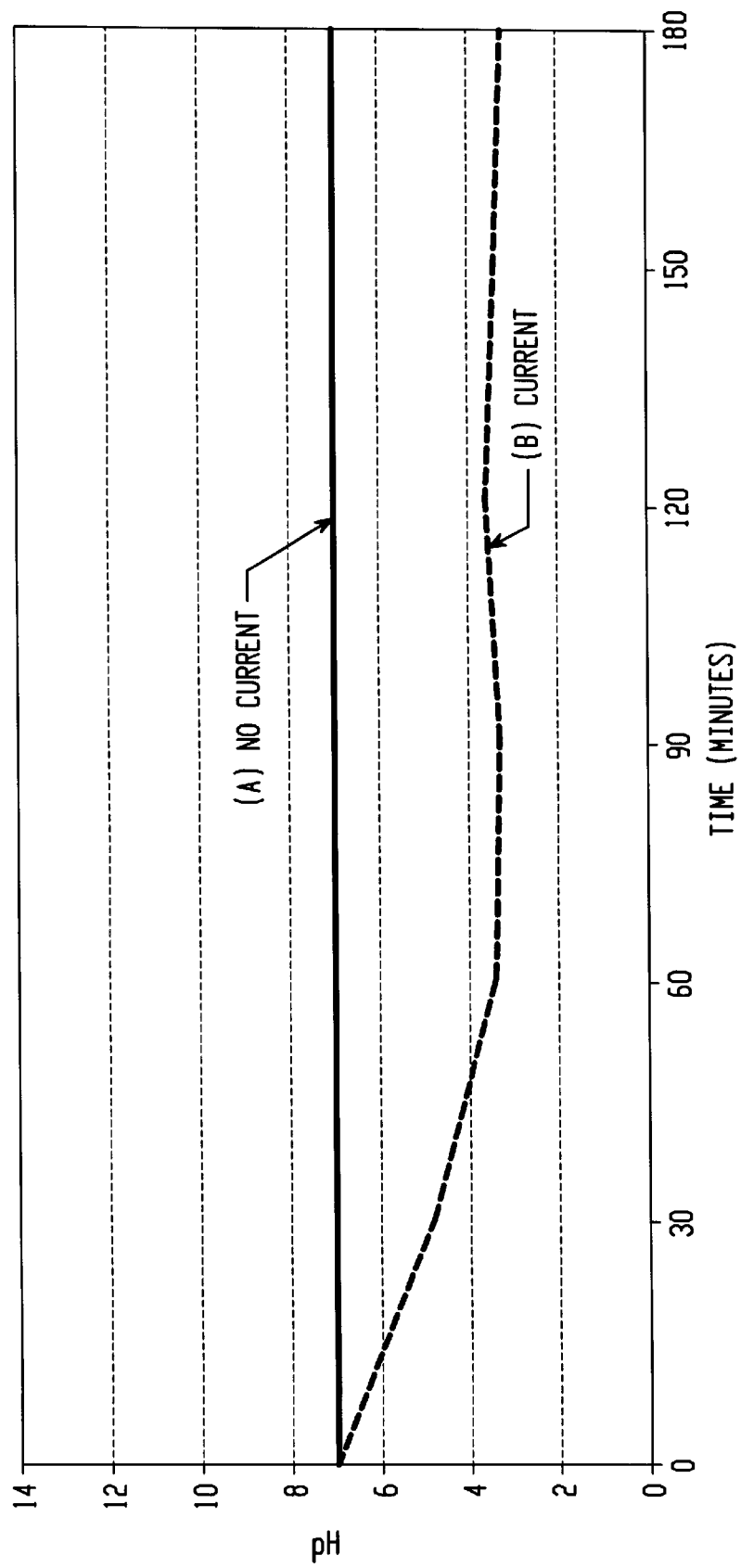
FIG. 16 is a graph showing the pH of an exiting sodium chloride solution over time produced by regenerant hydrogen ion, in accordance with the present invention, with a direct current applied versus when a direct current is not applied.

The results of the processes in procedures (A) and (B) are shown in FIG. 16. FIG. 16 shows the pH change of the exiting sodium chloride solution over time. As shown therein, a lower pH of the exiting solution occurs only when a current is applied to the reactor. Since the lower pH over time indicates a higher concentration of hydrogen ion, these results show the formation of the regenerant hydrogen ion in accordance with the present invention.

EXAMPLE 14

Hydroxyl Ion Formation to Regenerate Anion Exchange Material

A sodium chloride feed solution was prepared by adding sodium chloride to reverse osmosis water such that the final concentration of chloride approximated 100 mg/l as chloride. The final pH of the solution was tested to be 7.04.

(A) A continuous stream of the chloride feed solution was passed through the packed bed electrolytic reactor, having the structure illustrated in FIG. 13 and described above in connection therewith, by passing the chloride solution upwardly through the modified exchange material 108 from the bottom to top such that the chloride solution had a flow rate of about 500 ml/min through the electrolytic reactor. The space between the membranes in this example was packed with strong base polystyrene divinylbenzene cross-linked Type I anion exchange material having about 15% of its transfer sites converted to semiconductor junctions with SPS 70. The membranes 104 and 106 were, respectively, conventional anion and cation exchange membranes. No current was applied to the anode and cathode.

(B) The procedure (A) above was repeated, with the exception that a controlled current of 2.0 Amps was applied to the anode and cathode.

Figure 17:
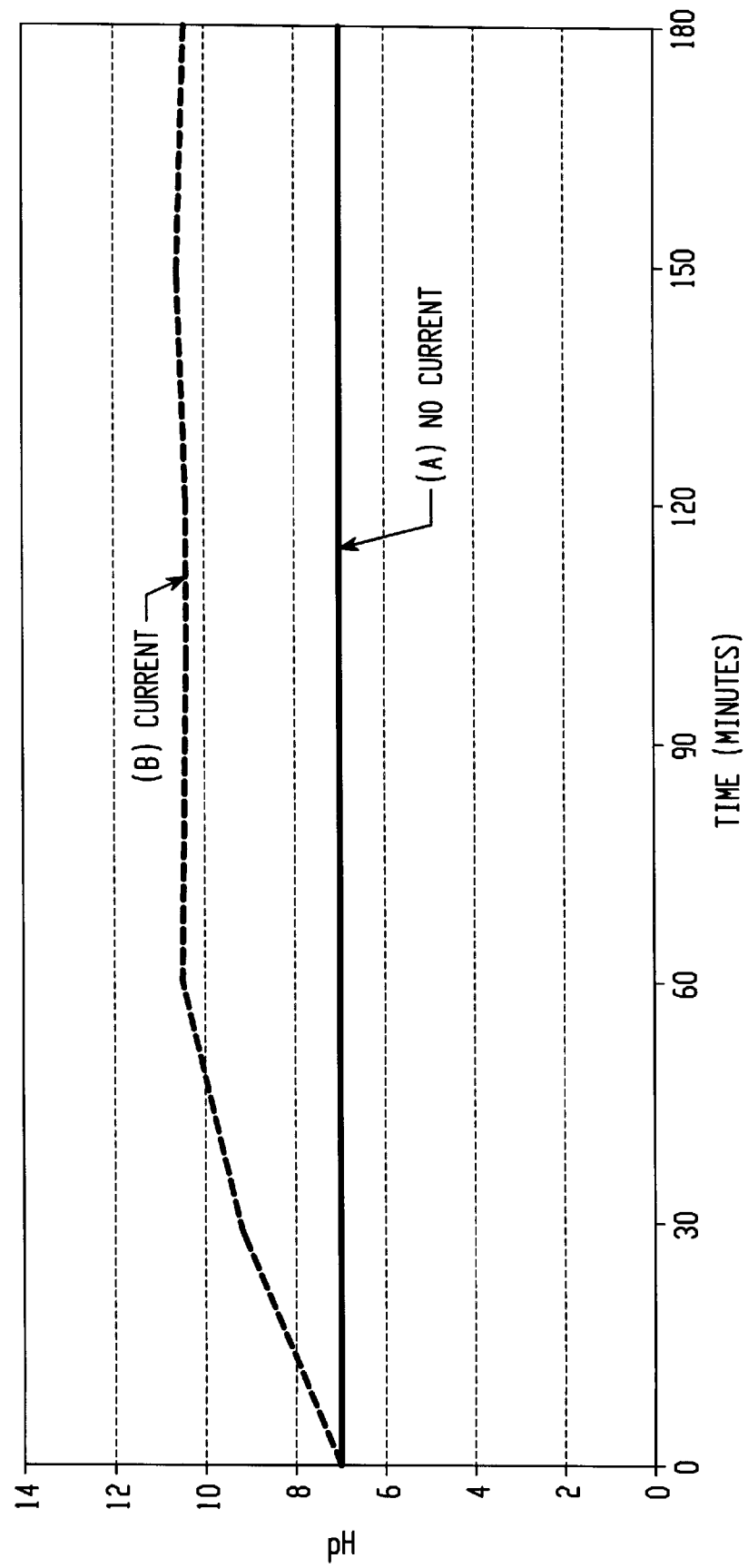
FIG. 17 is a graph showing the pH of an exiting sodium chloride solution over time produced by regenerant hydroxyl ion, in accordance with the present invention, with a direct current applied versus when a direct current is not applied.

The results of the processes in procedures (A) and (B) are shown in FIG. 17. FIG. 17 shows the pH change of the exiting sodium chloride solution over time. As shown therein, a higher pH of the exiting solution occurs only when a current is applied to the reactor. Since the higher pH over time indicates a reduction in the concentration of hydrogen ion, or an increase in the concentration of the hydroxyl ion, these results show the formation of the regenerant hydroxyl ion in accordance with the present invention.

EXAMPLE 15

Hydroxyl Ion and Hydrogen Ion Formation to Regenerate A Mixed Bed of Ion Exchange Material An electrolytic reactor, having the structure illustrated in FIG. 13 and described above in connection therewith, was assembled such that the space between the membranes was filled with a mixture of strong acid polystyrene divinylbenzene cross-linked cation exchange material having about 15% of its transfer sites converted to semiconductor junctions with manganese and strong base polystyrene divinylbenzene cross-linked Type I anion exchange material having about 15% of its transfer sites converted to semiconductor junctions with SPS 70. The mixture was made in the ratio of 40% cation exchange material and 60% anion exchange material, and all of the ion exchange material was in its fully regenerated form. Fifty liters of a 1000 mg/l sodium chloride solution was passed through the packed bed electrolytic reactor at which time sodium chloride was detected in the exit water stream. This indicated that the cation exchange material was in the sodium form, and the anion exchange material was in the chloride form. No current was applied to the anode and cathode.

(A) A continuous stream of deionized water was then passed through the packed bed electrolytic reactor, as described, by passing the deionized water upwardly through the mixed bed from the bottom to top such that the deionized water had a flow rate of about 500 ml/min through the reactor. No current was applied to the anode and cathode.

(B) The procedure (A) above was repeated, with the exception that a controlled current of 2.8 Amps was applied to the anode and cathode for one hour.

Figure 18:
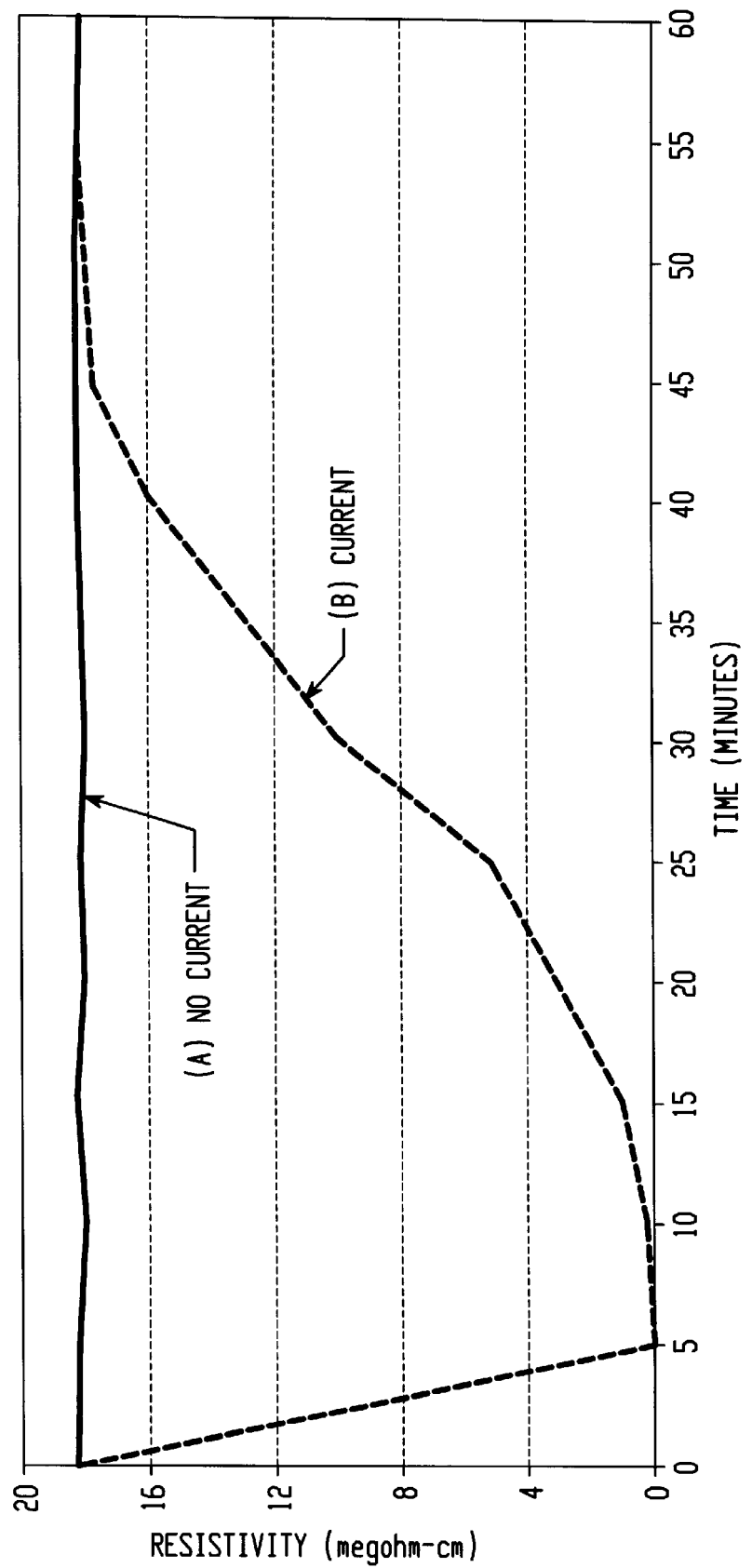
FIG. 18 is a graph showing the resistivity of an exiting deionized water solution over time produced by regenerant hydrogen ions and regenerant hydroxyl ions regenerating the packed bed, in accordance with the present invention, with a direct current applied versus when a direct current is not applied.

The results of the processes in procedures (A) and (B) are shown in FIG. 18. FIG. 18 shows the resistivity change of the exiting water solution over time. As shown therein, a drastic reduction in the resistivity of the exiting water solution, indicating the regeneration of the ion exchange material, occurs only when a current is applied to the reactor.

(C) After the completion of (B), the current was turned off, and the flow of aqueous solution was halted. A 1000 mg/l sodium chloride solution was passed through the packed bed electrolytic reactor until sodium chloride was detected in the exit water stream. This occurred at 31 liters indicating that the ion exchange material had been partially regenerated during (B).

Purification of Aqueous Solutions

Figure 19:
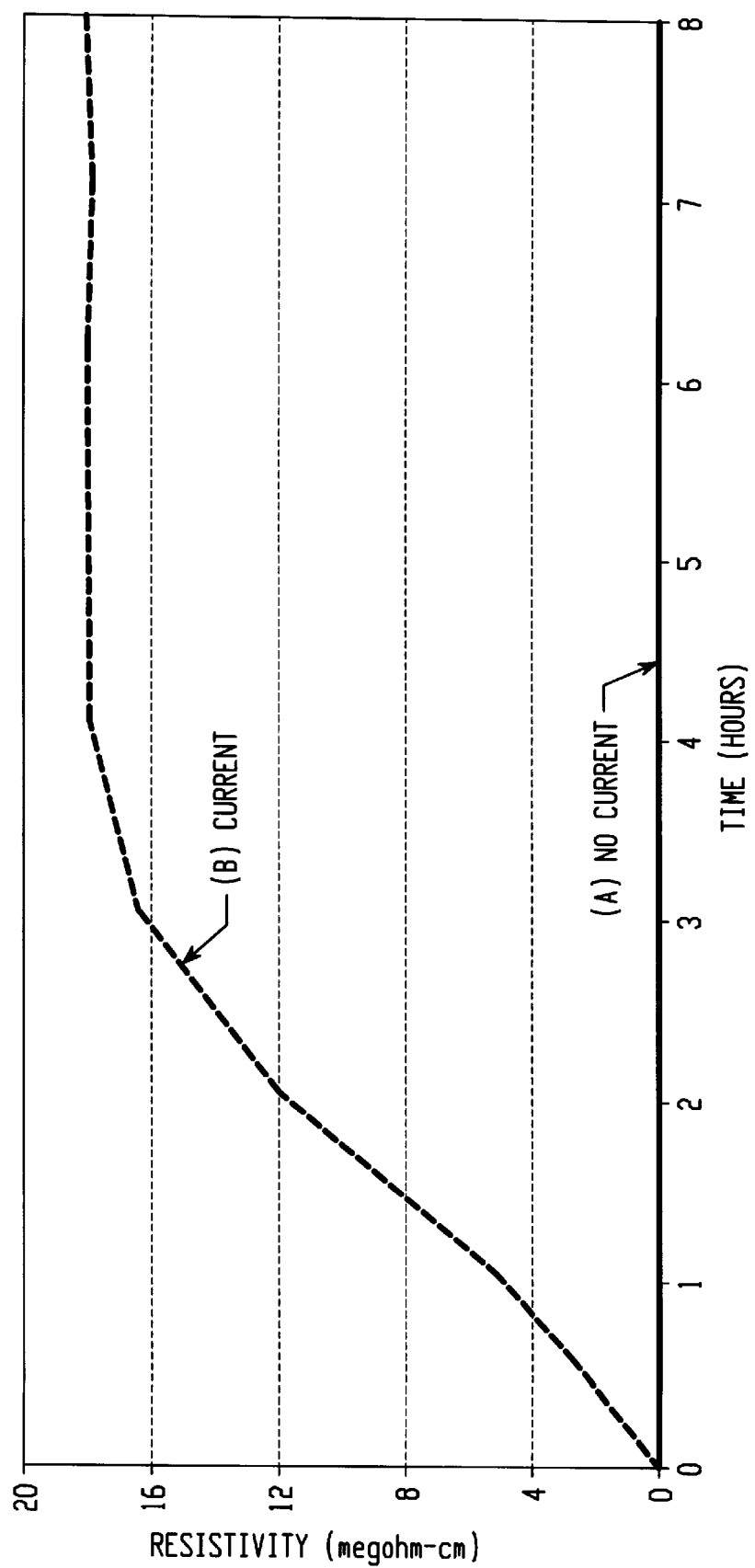
FIG. 19 is a graph showing the resistivity of an exiting water solution containing sodium bicarbonate and carbon dioxide over time produced by regenerant hydrogen ions and regenerant hydroxyl ions regenerating the packed bed and purifying the aqueous solution, in accordance with the present invention, with a direct current applied versus when a direct current is not applied.

The following example demonstrates the electrolytic process of the present invention for the controlled purification of aqueous solutions. In the example, the tests were done with an electrolytic reactor having the structure as illustrated in FIG. 14 and described above in Example 5. All water was tempered to 77° F. and all solutions flowed upwardly through the ion exchange materials. The graph shown in FIG. 19 illustrates the results in resistivity of the exiting solution with and without application of electric current to the reactor.

EXAMPLE 16

Purification of an Aqueous Solution

A solution of reverse osmosis water containing sodium bicarbonate and carbon dioxide was prepared. The final resistivity was tested to be 0.05 megohm-cm.

(A) A continuous stream of the reverse osmosis water was passed through the packed bed electrolytic reactor by passing the reverse osmosis water upwardly through each ion exchange material 212, 214 and 216 in sequence from the bottom to top. The reverse osmosis water had a flow rate of about 500 ml/min through the electrolytic reactor. The reverse osmosis water was thus passed in series through each of the three chambers containing the ion exchange materials. The resin 212 in the first chamber in this example was strong base polystyrene divinylbenzene cross-linked Type I anion exchange material in the chloride form having about 15% of its transfer sites converted to semiconductor junctions with SPS 70. The resin 214 in the second chamber was strong acid polystyrene divinylbenzene cross-linked cation exchange material in the sodium form having about 15% of its transfer sites converted to semiconductor junctions with manganese. The resin 216 in the third chamber was a mixture of 40% strong acid polystyrene divinylbenzene cross-linked cation exchange material in the sodium form having about 15% of its transfer sites converted to semiconductor junctions with manganese and 60% strong base polystyrene divinylbenzene cross-linked Type I anion exchange material in the chloride form having about 15% of its transfer sites converted to semiconductor junctions with SPS 70. The ion exchange membranes 208 and 210 were, respectively, conventional anion and cation exchange membranes. No current was applied to the anode and cathode.

(B) The procedure (A) above was repeated, with the exception that a controlled current of 2.0 Amps was applied to the anode and cathode.

The results of the processes in procedures (A) and (B) are shown in FIG. 19. FIG. 19 shows the resistivity change of the exiting water solution over time. As shown therein, an increased resistivity of the exiting solution, indicating the purification of the reverse osmosis water, occurs only when a current is applied to the reactor.

It is preferred that the ion exchange material be packed tightly in the electrolytic reactor so as to ensure intimate contact between the ion exchange material particles themselves, the ion exchange membranes, and the electrodes, if in contact with one or both electrodes. This intimate contact ensures the highest efficiency of the purification or the conversion, if oxidation or reduction. However, it is contemplated as part of this invention that loose packing of the ion exchange material can be employed in appropriate circumstances. Although not necessarily achieving the highest overall efficiency for the system, there may be circumstances in which loose packing can be employed, since the benefits obtained by the present invention can still be achieved.

Further, as described hereinbefore, the modified ion exchange material of the present invention need not be particulate, such as granules, beads or grains. Non-particulate ion exchange materials, such as powder, membranes and structures formed from powder, particulate or membranes, can likewise be modified in accordance with the present invention by forming semiconductor junctions on a portion of the ionic sites of the ion exchange material. Also, as stated, minor amounts of the opposite ion exchange material can be tolerated in a monobed ion exchange reactor and, in appropriate circumstances, such as described above, a mixed bed having both modified anion exchange resin and modified cation exchange resin can be utilized in the reactor within the scope of the present invention. In a mixed bed, the modified anion exchange resin and modified cation exchange resin can be appropriately layered as known in the art.

The foregoing descriptions and drawings should be considered as illustrative only of the principles of the invention. Since numerous applications of the present invention will readily occur to those skilled in the art, it is not desired to limit the invention to the specific examples disclosed or the exact construction and operation shown and described. Rather, all suitable modifications and equivalents may be resorted to, falling within the scope of the invention.

What is claimed is:

1. A packed bed electrolytic reactor which comprises an anode, a cathode and a bed of a particulate ion exchange material packed between said anode and said cathode, said ion exchange material modified by having a portion of the total ion exchange sites converted to semiconductor junctions.

2. A packed bed electrolytic reactor as defined in claim 1, wherein said modified ion exchange material is a modified cation exchange material or a modified anion exchange material.

3. A packed bed electrolytic reactor as defined in claim 1, wherein said modified ion exchange material is a mixture of modified anion and cation exchange materials.

4. A packed bed electrolytic reactor as defined in claim 1, wherein said bed of particulate ion exchange material comprises at least two chambers containing ion exchange material, and said chambers being separated by at least one ion exchange membrane and the particulate ion exchange material of each of said chambers being in contact with at least one of the anode and the cathode.

5. A packed bed electrolytic reactor as defined in claim 1, wherein said modified ion exchange material is in physical contact with one or both of said anode and said cathode.

6. A packed bed electrolytic reactor as defined in claim 1, wherein said modified ion exchange material is separated from said anode and said cathode.

7. A packed bed electrolytic reactor as defined in claim 6, wherein said semiconductor junctions are sufficient to cause formation of regenerant ions under the influence of direct electrical potential.

8. A packed bed electrolytic reactor as defined in claim 1 wherein said semiconductor junctions are formed by permanently bonding counter ions to a portion of said ion exchange material.

9. An electrolytic reactor as defined in claim 8, wherein said ion exchange material is a cation exchange material and said semiconductor junctions are formed by polyvalent metal cations permanently bonded to said cation exchange material.

10. An electrolytic reactor as defined in claim 8, wherein said ion exchange material is an anion exchange material and said semiconductor junctions are formed by polyvalent anions permanently bonded to said anion exchange material.

* * * * *